US006858074B2

(12) United States Patent
Anderson et al.

(10) Patent No.: US 6,858,074 B2
(45) Date of Patent: Feb. 22, 2005

(54) HIGH EARLY-STRENGTH CEMENTITIOUS COMPOSITION

(75) Inventors: James Edward Anderson, Henderson, NV (US); Joseph Andrew Daczko, Hiram, OH (US); John Joseph Luciano, Russell, OH (US)

(73) Assignee: Construction Research & Technology GmbH, Trostberg (DE)

( * ) Notice: Subject to any disclaimer, the term of this patent is extended or adjusted under 35 U.S.C. 154(b) by 244 days.

(21) Appl. No.: 10/218,544

(22) Filed: Aug. 14, 2002

(65) Prior Publication Data

US 2003/0127026 A1 Jul. 10, 2003

Related U.S. Application Data

(60) Provisional application No. 60/337,511, filed on Nov. 5, 2001.

(51) Int. Cl.$^7$ ............................................. C04B 24/04
(52) U.S. Cl. ...................... 106/724; 106/725; 106/727; 106/728; 106/823; 524/5
(58) Field of Search ................................. 106/724, 725, 106/727, 728, 823; 524/5

(56) References Cited

U.S. PATENT DOCUMENTS

| 5,085,708 | A | * | 2/1992 | Moriya et al. |
|---|---|---|---|---|
| 5,158,996 | A | | 10/1992 | Valenti |
| 5,162,402 | A | | 11/1992 | Ogawa et al. |
| 5,203,919 | A | | 4/1993 | Bobrowski et al. |
| 5,350,450 | A | * | 9/1994 | Hamabe et al. |
| 5,358,566 | A | * | 10/1994 | Tanaka et al. |
| 5,393,343 | A | | 2/1995 | Darwin et al. |
| 5,427,617 | A | * | 6/1995 | Bobrowski et al. |
| 5,494,516 | A | * | 2/1996 | Drs et al. |
| 5,567,236 | A | * | 10/1996 | Schapira et al. |
| 5,583,183 | A | | 12/1996 | Darwin et al. |
| 5,591,259 | A | | 1/1997 | Huang et al. |
| 5,609,681 | A | | 3/1997 | Drs et al. |
| 5,612,396 | A | | 3/1997 | Valenti et al. |
| 5,629,048 | A | | 5/1997 | Kinney |
| 5,633,298 | A | * | 5/1997 | Arfaei et al. |
| 5,643,978 | A | * | 7/1997 | Darwin et al. ................. 524/5 |
| 5,660,626 | A | * | 8/1997 | Ohta et al. |
| 5,661,206 | A | | 8/1997 | Tanaka et al. |
| 5,665,158 | A | * | 9/1997 | Darwin et al. ............... 106/808 |
| 5,668,195 | A | | 9/1997 | Leikauf |
| 5,674,929 | A | | 10/1997 | Melbye |
| 5,703,174 | A | | 12/1997 | Arfaei et al. |
| 5,725,657 | A | * | 3/1998 | Darwin et al. ............... 106/808 |
| 5,728,207 | A | * | 3/1998 | Arfaei et al. |
| 5,786,425 | A | | 7/1998 | Sperling et al. |
| 5,792,252 | A | * | 8/1998 | Sprouts |
| 5,840,114 | A | | 11/1998 | Jeknavorian et al. |
| 5,880,182 | A | * | 3/1999 | Minomiya et al. |
| 5,895,525 | A | | 4/1999 | Huang et al. |
| 5,912,284 | A | | 6/1999 | Hirata et al. |
| 5,922,124 | A | | 7/1999 | Supplee |
| 6,008,275 | A | * | 12/1999 | Moreau et al. ................. 524/5 |
| 6,063,184 | A | | 5/2000 | Leikauf et al. |
| 6,136,088 | A | | 10/2000 | Farrington |
| 6,136,950 | A | * | 10/2000 | Vickers et al. ............... 528/363 |
| 6,187,841 | B1 | | 2/2001 | Tanaka et al. |
| 6,267,814 | B1 | * | 7/2001 | Bury et al. |
| 6,284,867 | B1 | | 9/2001 | Vickers, Jr. et al. |
| 6,290,770 | B1 | * | 9/2001 | Moreau et al. ............. 106/708 |
| 6,310,143 | B1 | * | 10/2001 | Vickers et al. ............ 525/327.6 |
| 6,387,173 | B2 | * | 5/2002 | Greenwood et al. |
| 6,391,106 | B2 | * | 5/2002 | Moreau et al. ............... 106/724 |

FOREIGN PATENT DOCUMENTS

WO        WO/00/77058 A1    12/2000

OTHER PUBLICATIONS

Tom Pyle, Robert S. Sugar, Abstract—"Rapid Strength Portland Cement Concrete" California Department of Transportation, Materials Engineering and Testing Services, Caltrans/Paving Association, Concrete Paving Conference, Dec. 2001.
Tom Pyle, "Fast–Setting Concrete Evaluated in California" Apr. 2002 Better Roads.
Jim Anderson, "Paving Repair Finds a Four–Hour Champion" Dec. 2001 Concrete Construction.
Ed Rice, Four vs. Two Hours, Feb. 2002, Concrete Construction.
ACI Committee 325 Technical Document 325–11R–01 "Accelerated Techniques for Concrete Paving", no date available.

* cited by examiner

*Primary Examiner*—Paul Marcantoni
(74) *Attorney, Agent, or Firm*—Curatolo Sidoti Co. LPA; Joseph G. Curatolo; James E. Oehlenschlager

(57) ABSTRACT

A high early-strength cementitious composition comprising a hydraulic cement; and a combination admixture system wherein the combination admixture system comprises a polycarboxylate high range water reducing dispersant in combination with an accelerator and a retarder. The admixture allows for acceptable workability and development of high early-strength in cementitious compositions without the use of an external heat source.

55 Claims, No Drawings

US 6,858,074 B2

HIGH EARLY-STRENGTH CEMENTITIOUS COMPOSITION

CROSS REFERENCE TO RELATED APPLICATIONS

This application claims the benefit of the filing date of U.S. Provisional Application for Patent Ser. No. 60/337,511, filed Nov. 5, 2001.

BACKGROUND OF THE INVENTION

With some concrete construction, especially in high-traffic areas, it is desirable to have the affected areas in service as soon as possible. Typically, a minimum compressive and/or flexural strength is specified, and must be reached, before opening the area to use. In congested urban areas, traffic volumes can be so high that the contracts often limit shut-down periods for pavement repairs to 8 hours or less. As the removal of old concrete and the required preparation work can be up to 4 hours, the fresh concrete being placed ideally should achieve the minimum specified strength in a maximum of 4 hours after placement. This trend is reflected by the various State Departments of Transportation in their standards for concrete placement, wherein a minimal amount of time is allowed for sufficient strength generation.

Fast-track paving can and does occur with ordinary portland cement (OPC)-based concrete; however, OPC-based concrete mixtures generally cannot achieve early-strength requirements without sacrificing necessary working, placement and finishing time properties. Portland cement-based concrete mixtures usually require a minimum of twenty-four hours and frequently five to fourteen days to gain sufficient strength to allow a return to service. Roughly a decade ago, fast track OPC-based concrete mixtures could be produced that developed sufficient strength to open a pavement to traffic in less than 12 hours. During the past decade, there has been an increasing emphasis on researching materials and processes that will allow early opening for concrete pavements. For example, in 1998 the Virginia DOT used a rapid strength OPC-based concrete mixture to return the Braddock Road Bridge over Interstate 495 back to service in just under eight hours. In the mid-90's the New Jersey DOT developed a "fast track mix" that could achieve compressive strength of 3000 psi (20.7 MPa) and flexural strength of 350 psi (2.4 MPa) in six hours[2].

In the year 2000, Caltrans partnered with the American Concrete Pavement Association to "invite ready-mixed producers and admixture manufacturers to submit concrete mixes that were both cost-effective and fast setting." Consequently, an experimental program was launched to solve the puzzle of developing high-early flexural strength, such as 400 psi (2.8 MPa) in four hours after placement, using OPC-based concrete without the negative side effects of the proprietary binder systems.

In current practice, when fast turn-around was required, engineers have utilized fast-setting hydraulic cement concrete (FSHCC). For example, when there are very stringent engineering requirements, such as 400-psi flexural strength in four hours after placement, non-portland cement-based materials are used. These materials are very expensive. Additionally, the concrete produced with these binders is also prone to undesirable side effects such as insufficient control of working time, and often requires a follow-up grinding process to achieve an acceptably smooth surface.

To achieve a rapid level of strength development without an external heat source, it is most unlikely that one could be successful using traditional dispersant chemistries due to their excessive retarding effect on cement hydration.

U.S. Pat. No. 5,494,516 discloses a process for modifying the slump of a concrete or mortar by the addition at different times of a water-soluble poly(alkylene oxide) and a β-naphthalene sulphonate-formaldehyde condensate, a plasticizer or superplasticizer.

U.S. Pat. No. 5,792,252 discloses a process producing a cementitious composition that has a set time which is initially retarded for extended workability, followed by accelerated hardening comprising adding to a cementitious composition an admixture of a) an alkali metal carbonate and b) a mono- or di-carboxylic acid which is used as an accelerator.

What is needed in the industry is an affordable cementitious composition that provides acceptable and predictable workability while exhibiting high early compressive and flexural strength using conventional and locally available materials.

SUMMARY OF THE INVENTION

Generally, the present invention is directed to high early-strength cementitious compositions. More particularly, in one embodiment, the present invention is directed to high early-strength cementitious compositions containing a combination admixture system (composition of admixtures) which comprises a polycarboxylate high range water reducing dispersant, an accelerator and a retarder.

A significant advantage of the present invention is the ability to use a conventional non-rapid setting hydraulic cement, such as portland cement, for example, in applications that require the early development of a high strength. This avoids the necessity of having to use expensive and sometimes labor intensive rapid set cements.

In one embodiment, the present invention comprises a high early-strength composition of admixtures for cementitious compositions that comprises a polycarboxylate high range water reducing dispersant, an accelerator, and a retarder capable in combination of providing the cementitious composition with flexural strength of at least 400 pounds per square inch and compressive strength of at least 2,200 pounds per square inch within 4 hours after placement.

In another embodiment, the present invention further comprises a high early-strength cementitious composition which comprises a hydraulic cement and a composition of admixtures, wherein the composition of admixtures in combination comprise a polycarboxylate high range water reducing dispersant, an accelerator, and a retarder, wherein the high early-strength cementitious composition within 4 hours after placement has a flexural strength of at least 400 pounds per square inch and compressive strength of at least 2,200 pounds per square inch.

One embodiment of the present invention also comprises a method for preparing a high early-strength cementitious composition comprising forming a mixture of water, hydraulic cement and a composition of admixtures, said composition of admixtures in combination comprising a polycarboxylate high range water reducing dispersant, an accelerator, and a retarder, wherein the high early-strength cementitious composition within 4 hours after placement has a flexural strength of at least 400 pounds per square inch and compressive strength of at least 2,200 pounds per square inch.

Another embodiment of the present invention comprises a high early-strength cementitious composition, comprising a hydraulic cement and a composition of admixtures, said composition of admixtures in combination comprising:

a) a polycarboxylate high range water reducing dispersant of the following formula;

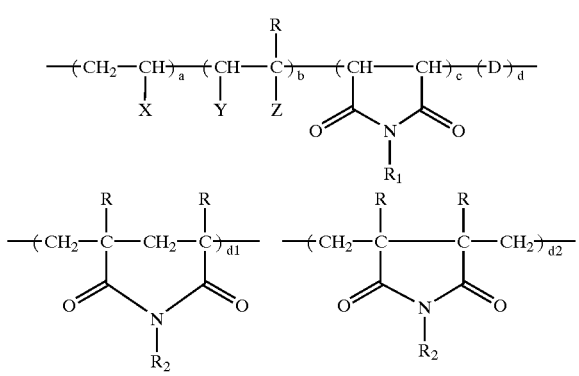

D=a component selected from the group consisting of the structure d1, the structure d2, and mixtures thereof;

X=H, $CH_3$, $C_2$ to $C_6$ Alkyl, Phenyl, Substituted Phenyl;

Y=H, —COOM;

R=H, $CH_3$;

Z=H, —$SO_3M$, —$PO_3M$, —COOM, —$OR_3$, —$COOR_3$, —$CH_2OR_3$, —$CONHR_3$, —$CONHC(CH_3)_2$ $CH_2SO_3M$, —$COO(CHR_4)_nOH$ where n=2 to 6;

$R_1$, $R_2$, $R_3$, $R_5$ are each independently —$(CH_2CHRO)_mR_4$ random copolymer of oxyethylene units and oxypropylene units where m=10 to 500 and wherein the amount of oxyethylene in the random copolymer is from about 60% to 100% and the amount of oxypropylene in the random copolymer is from 0% to about 40%;

$R_4$=H, Methyl, $C_2$ to $C_6$ Alkyl;

M=Alkali Metal, Alkaline Earth Metal, Ammonia, Amine, Methyl, $C_2$ to $C_6$ Alkyl;

a=0–0.8;

b=0.2–1.0;

c=0–0.5;

d=0–0.5; and wherein a, b, c, and d represent the mole fraction of each unit and the sum of a, b, c, and d is 1.0;

an accelerator; and a retarder.

In certain embodiments of the present invention, the high early-strength cementitious composition is further characterized in that the retarder and the polycarboxylate high range water reducing dispersant are added to the hydraulic cement before the accelerator.

Embodiments of the present invention also include high early-strength cementitious compositions such as concretes, mortars and grouts containing a hydraulic cement, preferably portland cement, and a combination admixture system (composition of admixtures) comprising a polycarboxylate high range water reducing dispersant, an accelerator, and a retarder.

DETAILED DESCRIPTION OF INVENTION

The present invention provides a novel combination of admixtures for high early-strength concrete, as well as a novel cementitious composition containing such a combination admixture system (composition of admixtures), and a method for preparing the cementitious composition. The present invention provides acceptable workability while exhibiting high early compressive and flexural strength without the use of an external heat source, allowing for fast placement and repair of concrete pavement with conventional concreting materials. In addition to its use for repairs, the present invention can be utilized in other conventional paving applications, such as full-scale paving through a conventional paving machine to install a road or highway, airport aprons and runways, bus pads, bridge repairs, city intersections, emergency replacements, industrial floors, post-tensioned slabs, telephone call boxes, tilt-up construction, and white topping mixes.

To achieve a rapid level of strength development, without an external heat source, a dispersant such as the latest generation of selected polycarboxylate high-range water-reducing (PCHRWR) admixtures is coupled with an accelerator and a hydration control additive (retarder) to achieve high strength very quickly.

In one embodiment the invention includes a cementitious composition comprising a hydraulic cement and a composition of admixtures, wherein the composition of admixtures comprises a polycarboxylate high range water reducing dispersant in combination with an accelerator and, a retarder, that is a hydration controlling admixture.

By combination, it is not meant that the admixtures must be added to the cementitious composition simultaneously. To produce the combination admixture, the retarder will generally be added at the batch plant while the accelerator is generally added later at the site where the cementitious composition is to be used. The polycarboxylate high range water reducing dispersant can be added at the site where the cementitious composition is to be used to increase the slump before the addition of the accelerator and/or at the batch plant to counter the low water to cement ratio and produce a cementitious composition that is workable, i.e. able to mixed and placed where desired.

The hydraulic cement comprising the cementitious formulation is selected from the group consisting of portland cement, modified portland cement, or masonry cement, and mixtures thereof. By portland cement is meant all cementitious compositions which have a high content of tricalcium silicate and includes portland cement and cements that are chemically similar or analogous to portland cement, the specification for which is set forth in ASTM specification C-150-00.

The term high range water reducing dispersant for cementitious compositions as used throughout this specification includes polycarboxylate high range water reducing dispersants.

To achieve a rapid level of strength development without an external heat source, traditional dispersant chemistries would not be successful because of their excessive retarding effect on cement hydration. Polycarboxylate high range water reducing dispersants have been successful, and certain of these dispersants are preferable cause of their ability to develop strength quickly. To hasten the cement chemistry reaction, chemical accelerators, either chloride or nonchloride-bearing additives, can be used successfully. Additionally, while not being limited to theory, it is thought that the interaction of the three components—polycarboxylate high range water reducing dispersant, accelerator, and retarder—provides the high early-strength, with the retarder and dispersant providing acceptable levels of workability to allow for placement of the cementitious material and imparting long term strength to the material.

Polycarboxylate high range water reducing dispersants include polymers with a carbon backbone with pendant side chains, wherein at least a portion of the side chains are attached to the backbone through a carboxyl group or an ether group. Polycarboxylate high range water reducing dispersants are very effective at dispersing and reducing the water content in hydraulic cements. These dispersants operate by surrounding a particle to be dispersed, and then repulsion forces between each polymer chain keeps the particles apart and more fluid.

The term polycarboxylate high range water reducing dispersant throughout this specification refers to polymers with a carbon backbone with pendant side chains, wherein at least a portion of the side chains are attached to the backbone through a carboxyl group or an ether group. The term dispersant is also meant to include those chemicals which also function as a plasticizer, water reducer, fluidizer, antiflocculating agent, or superplasticizer for cementitious compositions. Examples of polycarboxylate high range water reducing dispersants can be found in U.S. Pat. No. 6,267,814, U.S. Pat. No. 6,290,770, U.S. Pat. No. 6,310,143, U.S. Pat. No. 6,187,841, U.S. Pat. No. 5,158,996, U.S. Pat. No. 6,008,275, U.S. Pat. No. 6,136,950, U.S. Pat. No. 6,284,867, U.S. Pat. No. 5,609,681, U.S. Pat. No. 5,494,516; U.S. Pat. No. 5,674,929, U.S. Pat. No. 5,660,626, U.S. Pat. No. 5,668,195, U.S. Pat. No. 5,661,206, U.S. Pat. No. 5,358,566, U.S. Pat. No. 5,162,402, U.S. Pat. No. 5,798,425, U.S. Pat. No. 5,612,396, U.S. Pat. No. 6,063,184, and U.S. Pat. No. 5,912,284, U.S. Pat. No. 5,840,114, U.S. Pat. No. 5,753,744, U.S. Pat. No. 5,728,207, U.S. Pat. No. 5,725,657, U.S. Pat. No. 5,703,174, U.S. Pat. No. 5,665,158, U.S. Pat. No. 5,643,978, U.S. Pat. No. 5,633,298, U.S. Pat. No. 5,583,183, and U.S. Pat. No. 5,393,343, which are all incorporated herein by reference. The polycarboxylate high range water reducing dispersant used in the admixture of the present invention may include but is not limited to dispersants or water reducers sold under the trademarks GLENIUM® 3000 NS, GLENIUM® 3030NS, GLENIUM® 3200 HES (Master Builders Inc.), ADVA® (W. R. Grace), VISCOCRETE® (Sika), and SUPERFLUX® (Axim). Most preferred are the embodiments in which the polycarboxylate high range water reducing dispersant is a dispersant or water reducer sold under the trademarks GLENIUM® 3030NS and GLENIUM® 3200 HES (Master Builders Inc.).

The dispersants used in combination with the accelerator and the retarder can be at least one of the dispersant formulas a) through 1):

a) a dispersant of Formula (I)

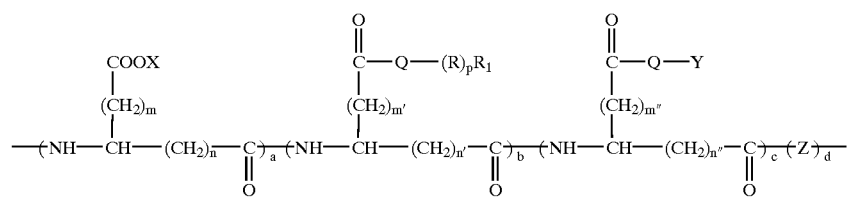

wherein in Formula (I)
X is selected from the group consisting of hydrogen, an alkali earth metal ion, an alkaline earth metal ion, ammonium ion, and amine;
R is selected from the group consisting of $C_1$ to $C_6$ alkyl(ene) ether and mixtures thereof and $C_1$ to $C_6$ alkyl(ene) imine and mixtures thereof;
Q is selected from the group consisting of oxygen, NH, and sulfur;
p is a number from 1 to about 300 resulting in at least one of a linear side chain and branched side chain;
$R_1$ is selected from the group consisting of hydrogen, $C_1$ to $C_{20}$ hydrocarbon, and functionalized hydrocarbon containing at least one of —OH, —COOH, an ester or amide derivative of —COOH, sulfonic acid, an ester or amide derivative of sulfonic acid, amine, and epoxy;
Y is selected from the group consisting of hydrogen, an alkali earth metal ion, an alkaline earth metal ion, ammonium ion, amine, a hydrophobic hydrocarbon and polyalkylene oxide moiety that functions as a defoamer;
m, m', m", n, n', and n" are each independently 0 or an integer between 1 and about 20;
Z is a moiety containing at least one compound selected from the group consisting of i) at least one amine and one acid group, ii) two functional groups capable of incorporating into the backbone selected from the group consisting of dianhydrides, dialdehydes, and di-acid-chlorides, and iii) an imide residue; and
wherein a, b, c, and d reflect the mole fraction of each unit wherein the sum of a, b, c, and d equal one, wherein a, b, c, and d are each a value greater than or equal to zero and less than one, and at least two of a, b, c, and d are greater than zero.

b) a dispersant of Formula (II)

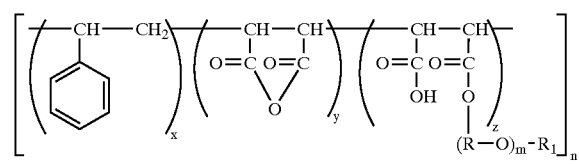

wherein in Formula (II):
R is a $C_{2-6}$ alkylene radical;
$R_1$ is a $C_{1-20}$ alkyl, $C_{6-9}$ cycloalkyl or phenyl group;
x, y, and z are numbers from 0.01 to 100;
m is a number from 1 to 100; and
n is a number from 10 to 100;

c) a dispersant of Formula (III)

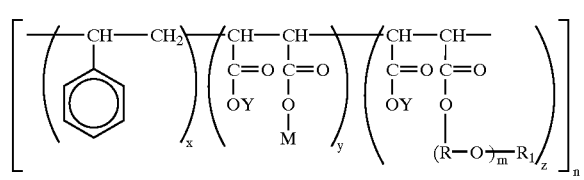

wherein in Formula (III):
M is hydrogen or the residue of a hydrophobic polyalkylene glycol or polysiloxane;
Y is hydrogen, an alkali or alkaline earth metal ion, ferrous ion, aluminum ion, (alkanol)ammonium ion, or (alkyl)ammonium ion;

R is a $C_{2-6}$ alkylene radical;

$R_1$ is a $C_{1-20}$ alkyl, $C_{6-9}$ cycloalkyl, or phenyl group;

x, y, and z are numbers from 1 to 100;

d) a dispersant comprising at least one polymer or a salt thereof having the form of a copolymer of
  i) a maleic anhydride half-ester with a compound of the formula $RO(AO)_mH$, wherein R is a $C_1$–$C_{20}$ alkyl group, A is a $C_{2-4}$ alkylene group, and m is an integer from 2–16; and
  ii) a monomer having the formula $CH_2=CHCH_2$—$(OA)_nOR$, wherein n is an integer from 1–90 and R is a $C_{1-20}$ alkyl group;

e) a reaction product formed by reacting a polycarboxylic acid with a nitrogeneous acrylic polymer;

f) a dispersant obtained by copolymerizing about 5 to about 98% by weight of an (alkoxy)polyalkylene glycol mono(meth)acrylic ester monomer (a) represented by the following general formula (f1):

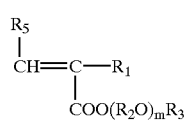

(f1)

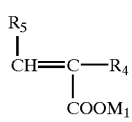

(f2)

wherein $R_1$ is hydrogen or a methyl group, $R_2O$ is one species or a mixture of two or more species of oxyalkylene group of 2 to 4 carbon atoms, providing two or more species of the mixture may be added either in the form of a block or in a random form, $R_3$ is hydrogen or an alkyl group of 1 to 5 carbon atoms, and m is a value indicating the average addition mol number of oxyalkylene groups that is an integer in the range of 1 to 100; about 95% to about 2% by weight of a (meth) acrylic acid monomer (b) represented by the above general formula (f2), wherein $R_4$ and $R_5$ are each independently hydrogen or a methyl group, and $M_1$ is hydrogen, a monovalent metal atom, a divalent metal atom, an ammonium group, or an organic amine group; and, 0 to about 50% by weight of a monomer (c) copolymerizable with monomers (a) and (b), provided that the total amount of (a), (b), and (c) is 100% by weight;

g) a graft polymer that is a polycarboxylic acid or a salt thereof, having side chains derived from at least one species selected from the group consisting of oligoalkyleneglycols, polyalcohols, polyalkylene glycols; and mixtures thereof;

h) a styrene-maleic anhydride copolymer in free acid or salt form, wherein the copolymer consists of the following monomers and numbers of monomer units:

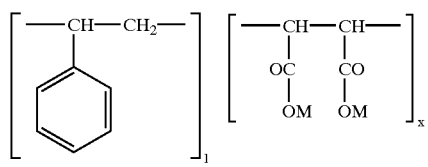

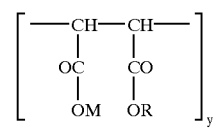

wherein:

M is selected from hydrogen, a cation and a residue of a hydrophobic polyalkylene glycol or polysiloxane;

R is the residue of a methylpoly(ethylene) glycol of weight average molecular weight 900–2000;

x=0.35–0.75; and y=0.25–0.65;

i) a dispersant of Formula (IV):

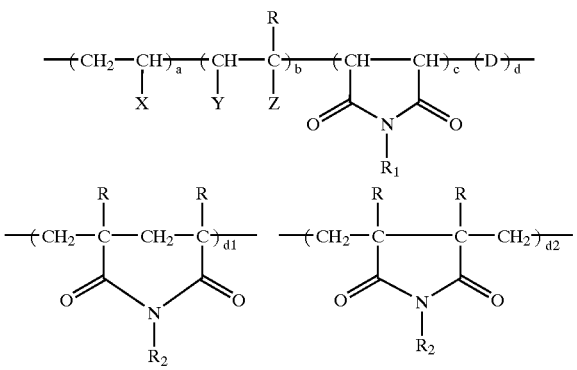

wherein in Formula (IV):

D=a component selected from the group consisting of the structure d1, the structure d2, and mixtures thereof;

X=H, $CH_3$, $C_2$ to $C_6$ Alkyl, Phenyl, Substituted Phenyl;

Y=H, —COOM;

R=H, $CH_3$;

Z=H, —$SO_3M$, —$PO_3M$, —COOM, —$OR_3$, —$COOR_3$, —$CH_2OR_3$, —$CONHR_3$, —CONHC$(CH_3)_2$ $CH_2SO_3M$, —$COO(CHR_4)_nOH$ where n=2 to 6;

$R_1$, $R_2$, $R_3$, $R_5$ are each independently —$(CH_2CHRO)_mR_4$ random copolymer of oxyethylene units and oxypropylene units where m=10 to 500 and wherein the amount of oxyethylene in the random copolymer is from about 60% to 100% and the amount of oxypropylene in the random copolymer is from 0% to about 40%;

$R_4$=H, Methyl, $C_2$ to $C_6$ Alkyl;

M=Alkali Metal, Alkaline Earth Metal, Ammonia, Amine, Substituted Amine, Methyl, $C_2$ to $C_6$ Alkyl;

a=0–0.8;

b=0.2–1.0;

c=0–0.5;

d=0–0.5; and wherein a, b, c, and d represent the mole fraction of each unit and the sum of a, b, c, and d is 1.0;

j) a dispersant of Formula (V):
wherein in Formula (V):

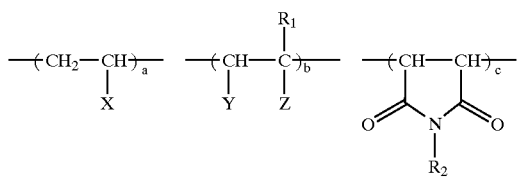

the "b" structure is one of a substituted carboxylic acid monomer, an ethylenically unsaturated monomer, and maleic anhydride wherein an acid anhydride group (—CO—O—CO—) is formed in place of the groups Y and Z between the carbon atoms to which the groups Y and Z are bonded respectively, and the "b" structure must include at least one moiety with a pendant ester linkage and at least one moiety with a pendant amide linkage;

X=H, $CH_3$, $C_2$ to $C_6$ Alkyl, Phenyl, or Substituted Phenyl such as p-Methyl Phenyl, p-Ethyl Phenyl, Carboxylated Phenyl, Sulfonated Phenyl;

Y=H, —COOM, —COOH, or W;

W=a hydrophobic defoamer represented by the formula $R_5O-(CH_2CH_2O)_s-(CH_2C(CH_3)HO)_t-(CH_2CH_2O)_u$ where s, t, and u are integers from 0 to 200 with the proviso that t>(s+u) and wherein the total amount of hydrophobic defoamer is present in an amount less than about 10% by weight of the derivatized polycarboxylate high range water reducing dispersant;

Z=H, —COOM, —$OR_3$, —$COOR_3$, —$CH_2OR_3$, or —$CONHR_3$;

$R_1$=H, or $CH_3$;

$R_2$, $R_3$, are each independently a random copolymer of oxyethylene units and oxypropylene units of the general formula —$(CH(R_1)CH_2O)_mR_4$ where m=10 to 500 and wherein the amount of oxyethylene in the random copolymer is from about 60% to 100% and the amount of oxypropylene in the random copolymer is from 0% to about 40%;

$R_4$=H, Methyl, or $C_2$ to $C_8$ Alkyl;

$R_5$=$C_1$ to $C_{18}$ alkyl or $C_6$ to $C_{18}$ alkyl aryl;

M=Alkali Metal, Alkaline Earth Metal, Ammonia, Amine, mono, di or tri alkyl substituted amine, unsaturated cyclic amine, preferably imidazole, saturated cyclic amine, preferably morpholine;

a=0.01–0.8;
b 0.2–0.99;
c=0–0.5; and
wherein a, b, c represent the mole fraction of each unit and the sum of a, b, and c, is 1;

k) a random copolymer corresponding to the following Formula (VI) in free acid or salt form having the following monomers and numbers of monomer units:

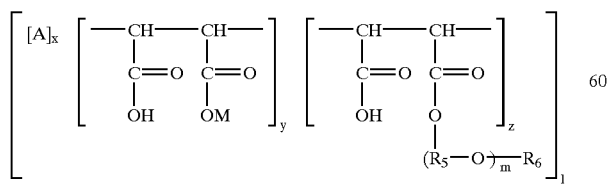

wherein A is selected from the moieties (i) and (ii)
(i) —$CR_1R_2$—$CR_3R_4$—

(ii)

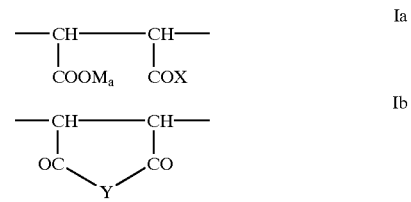

wherein $R_1$ and $R_3$ are selected from substituted benzene, $C_{1-8}$ alkyl, $C_{2-8}$ alkenyl, $C_{2-8}$ alkylcarbonyl, $C_{1-8}$ alkoxy, carboxyl, and hydrogen, or $R_1$ and $R_3$ can together with $R_2$ and/or $R_4$ form a ring; and $R_2$ and $R_4$ are selected from the group consisting of hydrogen and $C_{1-4}$ alkyl; $R_7$, $R_8$, $R_9$, and $R_{10}$ are individually selected from the group consisting of hydrogen, $C_{1-6}$ alkyl, or $R_1$ and $R_3$ together with $R_7$ and/or $R_8$, $R_9$, and $R_{10}$ form a continuous $C_{2-8}$ hydrocarbon chain joining the carbon atoms to which they are attached, the hydrocarbon chain optionally having at least one anionic group, preferably sulfonic;

M is selected from the group consisting of hydrogen, and the residue of a hydrophobic polyalkylene glycol or a polysiloxane, with the proviso that when A is (ii) and M is the residue of a hydrophobic polyalkylene glycol, M must be different from the group —$(R_5O)_m R_6$;

$R_5$ is a $C_{2-8}$ alkylene radical;

$R_6$ is selected from the group consisting of $C_{1-20}$ alkyl, $C_{6-9}$ cycloalkyl and phenyl;

n, x, and z are numbers from 1 to 100;
y is 0 to 100;
m is 2 to 1000;
the ratio of x to (y+z) is from 1:10 to 10:1 and the ratio of y:z is from 5:1 to 1:100;

l) a copolymer Formula (VII) based on oxyalkyleneglycol-alkenyl ethers and unsaturated dicarboxylic acid derivatives, comprising:
i) 10 to 90 mol % of component of the formula Ia and/or Ib:

$$\begin{array}{c}-CH-CH-\\ | \quad\quad | \\ COOM_a \quad COX\end{array} \quad \text{Ia}$$

$$\begin{array}{c}-CH-CH-\\ | \quad\quad | \\ OC \quad\quad CO\\ \backslash_Y\diagup\end{array} \quad \text{Ib}$$

wherein;
M is a hydrogen atom, a mono- or divalent metal cation, an ammonium ion, an organic amine residue, or a divalent metal cation;
a is 1, when M is a hydrogen atom, a mono- or divalent metal cation, an ammonium ion or an organic amine residue;
a is ½, when M is a divalent metal cation;
X is —$OM_a$, —O—$(C_mH_{2m}O)_n$—$R_1$, in which $R_1$ is a hydrogen atom, an aliphatic hydrocarbon radical containing from 1 to 20 carbon atoms, a cycloaliphatic hydrocarbon radical containing 5 to 8 carbon atoms or an optionally hydroxyl, carboxyl, or sulfonic substituted aryl radical containing 6 to 14 carbon atoms, m is 2 to 4, n is 0 to 100, —NHR$_2$, and/or —N(R$_2$)$_2$, in which R$_2$=R$_1$ or —CO—NH$_2$, and;

Y is an oxygen atom or —NR$_2$;

ii) 1 to 89 mol % of components of the general formula:

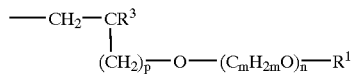

wherein R$_3$ is a hydrogen atom or an aliphatic hydrocarbon radical containing from 1 to 5 carbon atoms, p is 0 to 3, and R$_1$ is hydrogen, an aliphatic hydrocarbon radical containing from 1 to 20 carbon atoms, a cycloaliphatic hydrocarbon radical containing 5 to 8 carbon atoms or an optionally hydroxyl, carboxyl, or sulfonic substituted aryl radical containing 6 to 14 carbon atoms, m is 2 to 4, and n is 0 to 100, and iii) 0.1 to 10 mol % of components of the general formulae:

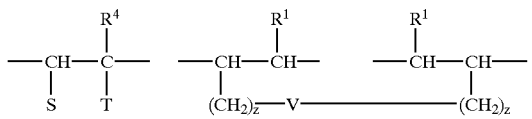

wherein S is a hydrogen atom or —COOM$_a$ or —COOR$_5$, T is —COOR$_5$, —W—R$_7$, —CO—[—NH—(CH2)3)—]$_s$—W—R$_7$, —CO—O—(CH$_2$)$_2$—W—R$_7$, a radical of the general formula:

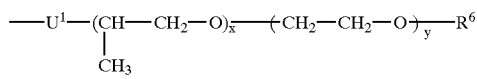

or —(CH$_2$)$_z$—V—(CH$_2$)$_z$—CH=CH—R$_1$, or when S is —COOR$_5$ or —COOM$_a$, U$_1$ is —CO—NHM—, —O— or —CH$_2$O, U$_2$ is —NH—CO—, —O— or —OCH$_2$, V is —O—CO—C$_6$H$_4$—CO—O— or —W—, and W is

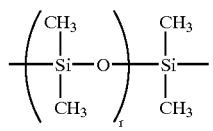

R4 is a hydrogen atom or a methyl radical, R5 is an aliphatic hydrocarbon radical containing 3 to 20 carbon atoms, a cycloaliphatic hydrocarbon radical containing 5 to 8 carbon atoms or an aryl radical containing 6 to 14 carbon atoms, R$_6$=R$_1$ or

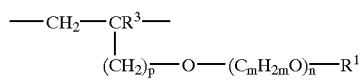

R$_7$=R$_1$ or

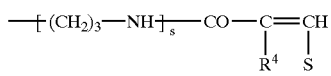

-continued $$—(CH_2)_z—O—CO—\underset{\underset{S}{R^4}}{C}=CH—$$

r is 2 to 100, s is 1 or 2, x is 1 to 150, y is 0 to 15 and z is 0 to 4.

In formula (g) the word "derived" does not refer to derivatives in general, but rather to any polycarboxylic acid/salt side chain derivatives of oligoalkyleneglycols, polyalcohols and polyalkylene glycols that are compatible with dispersant properties and do not destroy the graft polymer.

The preferred substituents in the optionally substituted aryl radical of formula (1), containing 6 to 14 carbon atoms, are hydroxyl, carboxyl, C$_{1-14}$ alkyl, or sulfonate groups.

The preferred substituents in the substituted benzene are hydroxyl, carboxyl, C$_{1-14}$ alkyl, or sulfonate groups.

The accelerator used in the admixture of the present invention can include, but is not limited to, a nitrate salt of an alkali metal, alkaline earth metal, or aluminum; a nitrite salt of an alkali metal, alkaline earth metal, or aluminum; a thiocyanate of an alkali metal, alkaline earth metal or aluminum; an alkanolamine; a thiosulphate of an alkali metal, alkaline earth metal, or aluminum; a hydroxide of an alkali metal, alkaline earth metal, or aluminum; a carboxylic acid salt of an alkali metal, alkaline earth metal, or aluminum (preferably calcium formate); a polyhydroxyalkylamine; a halide salt of an alkali metal or alkaline earth metal (preferably bromide), Examples of accelerators particularly suitable for use in the present invention include, but are not limited to, POZZOLITH® NC534, nonchloride type accelerator and/or RHEOCRETE® CNI calcium nitrite-based corrosion inhibitor both sold under the trademarks by Master Builders Inc. of Cleveland, Ohio.

The salts of nitric acid have the general formula M(NO$_3$)$_a$ where M is an alkali metal, or an alkaline earth metal or aluminum, and where a is 1 for alkali metal salts, 2 for alkaline earth salts, and 3 for aluminum salts. Preferred are nitric acid salts of Na, K, Mg, Ca and Al.

Nitrite salts have the general formula M(NO$_2$)$_a$ where M is an alkali metal, or an alkaline earth metal or aluminum, and where a is 1 for alkali metal salts, 2 for alkaline earth salts, and 3 for aluminum salts. Preferred are nitric acid salts of Na, K, Mg, Ca and Al.

The salts of the thiocyanic acid have the general formula M(SCN)$_b$, where M is an alkali metal, or an alkaline earth metal or aluminum, and where b is 1 for alkali metal salts, 2 for alkaline earth salts and 3 for aluminum salts. These salts are variously known as sulfocyanates, sulfocyanides, rhodanates or rhodamide salts. Preferred are thiocyanic acid salts of Na, K, Mg, Ca and Al.

Alkanolamine is a generic term for a group of compounds in which trivalent nitrogen is attached directly to a carbon atom of an alkyl alcohol. A representative formula is N[H]$_c$[(CH$_2$)$_d$CH$_2$OH]$_e$, where c is 3-e, d is 1 to about 5 and e is 1 to about 3. Examples include, but are not limited to, monoethanoalamine, diethanolamine and triethanolamine.

The thiosulfate salts have the general formula M$_f$(S$_2$O$_3$)$_g$ where M is alkali metal or an alkaline earth metal or aluminum, and f is 1 or 2 and g is 1, 2 or 3, depending on the valencies of the M metal elements. Preferred are thiosulfate acid salts of Na, K, Mg, Ca and Al.

The carboxylic acid salts have the general formula RCOOM wherein R is H or C$_1$ to about C$_{10}$ alkyl, and M is alkali metal or an alkaline earth metal or aluminum. Preferred are carboxylic acid salts of Na, K, Mg, Ca and Al. A preferred carboxylic acid salt is calcium formate.

A preferred polyhydroxylalkylamine has the general formula

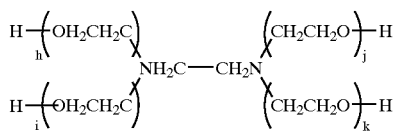

wherein h is 1 to 3, i is 1 to 3, j is 1 to 3, and k is 0 to 3. A preferred polyhydroxyalkylamine is tetrahydroxyethylethylenediamine.

Ambient temperature would control the amount of the retarder or hydration control additive that is required. The preferred retarder would have the ability to control both the aluminate and silicate cement reactions.

Retarding, or delayed-setting, admixtures are used to retard, delay, or slow the rate of setting of concrete. They can be added to the concrete mix upon initial batching or sometime after the hydration process has begun. Retarders are commonly used to offset the accelerating effect of hot weather on the setting of concrete, to delay the initial set of concrete or grout when difficult conditions of placement occur or problems of delivery to the job site, to allow time for special finishing processes or to aid in the reclamation of concrete left over at the end of the work day. Most retarders also act as water reducers and can also be used to entrain some air into concrete.

The retarder of the present invention can include but is not limited to an oxy-boron compound, lignin, a polyphosphonic acid, a carboxylic acid, a hydroxycarboxylic acid, polycarboxylic acid, hydroxylated carboxylic acid, fumaric, itaconic, malonic, borax, gluconic, and tartaric acid, lignosulfonates, ascorbic acid, isoascorbic acid, sulphonic acid-acrylic acid copolymer, and their corresponding salts, polyhydroxysilane, polyacrylamide, carbohydrates and mixtures thereof. Illustrative examples of retarders are set forth in U.S. Pat. Nos. 5,427,617 and 5,203,919, incorporated herein by reference. A further example of a retarder particularly suited for use in the present invention is a hydration control admixture sold under the trademark DELVO® by Master Builders Inc. of Cleveland, Ohio.

The dosages of the components of the high early-strength composition of admixtures, polycarboxylate high range water reducing dispersant, accelerator, and retarder, are governed by factors such as cement type and reactivity, ambient temperature, and concrete mixture proportions. The dosages of the components are summarized in Table A:

TABLE A

| Admixture Type | Approximate Solids Content, % | General Dosage Range oz/cwt | Preferred Dosage Range, oz/cwt | Primary Active Ingredient Wt. by Cement Wt., % |
|---|---|---|---|---|
| dispersant | 20–30 | 2–35 | 7–20 | 0.027–0.68 |
| accelerator | 30–50 | 5–120 | 60–100 | 0.018–2.03 |
| retarder | 10–20 | 0.25–8 | 0.75–3.0 | 0.002–0.053 | oz/cwt = fluid ounces per 100 pounds of cement

The approximate solids content is the concentration of the solids in solution and the primary active ingredient in the component provides the desired effect (i.e., set delay, acceleration, or reduced amount of water) on the cementitious composition. The Primary Active Ingredient Weight is a percentage based on the dry weight of the active ingredient per 100 pounds of dry cement.

The weight percentages of the components in the high early-strength composition of admixtures are preferably greater than 0% to about 2% retarder; about 5% to about 12% dispersant; and about 85% to about 95% accelerator based on solids (dry) content.

It should be noted, the combination of an accelerator and a retarder, particularly where rapid setting of the cementitious composition is desired, is contrary to conventional wisdom and practice. In fact, manufacturers of accelerating admixtures warn against their use even with retarding water reducing (dispersant) admixtures.

Aggregate can be included in the cementitious formulation to provide for mortars which include fine aggregate, and concretes which also include coarse aggregate. The fine aggregate are materials that pass through a Number 4 sieve (ASTM C125 and ASTM C33), such as silica sand. The coarse aggregate are materials that are retained on a Number 4 sieve (ASTM C125 and ASTM C33), such as silica, quartz, crushed round marble, glass spheres, granite, limestone, calcite, feldspar, alluvial sands, or any other durable aggregate, and mixtures thereof.

The cementitious composition described herein may contain other additives or ingredients and should not be limited to the stated formulations. Cement additives that can be added include, but are not limited to: air-entraining or air detraining agents, corrosion inhibitors, any other dispersants for cement, pigments, wetting agents, water soluble polymers, strength enhancing agents, rheology modifying agents, water repellents, fibers, dampproofing admixtures, gas formers, permeability reducers, pumping aids, fungicidal admixtures, germicidal admixtures, insecticidal admixtures, finely divided mineral admixtures, alkali-reactivity reducer, bonding admixtures, and any other admixture or additive that does not adversely affect the properties of the admixture of the present invention.

Corrosion inhibitors in concrete serve to protect embedded reinforcing steel from corrosion due to its highly alkaline nature. The high alkaline nature of the concrete causes a passive and noncorroding protective oxide film to form on the steel. However, carbonation or the presence of chloride ions from deicers or seawater can destroy or penetrate the film and result in corrosion. Corrosion-inhibiting admixtures chemically arrest this corrosion reaction. The materials most commonly used to inhibit corrosion are calcium nitrite, sodium nitrite, sodium benzoate, certain phosphates or fluorosilicates, fluoroaluminates, amines, organic based water repelling agents, and related chemicals.

Dampproofing admixtures reduce the permeability of concrete that have low cement contents, high water-cement ratios, or a deficiency of fines in the aggregate. These admixtures retard moisture penetration into dry concrete and include certain soaps, stearates, and petroleum products.

Permeability reducers are used to reduce the rate at which water under pressure is transmitted through concrete. Silica fume, fly ash, ground slag, natural pozzolans, water reducers, and latex can be employed to decrease the permeability of the concrete. Pozzolan is a siliceous, or siliceous and aluminous material, which in itself possesses little or no cementitious value. However, in finely divided form and in the presence of moisture, pozzolan will chemically react with calcium hydroxide at ordinary temperatures to form compounds possessing cementitious Pumping aids are added to concrete mixes to improve pumpability. These admixtures thicken the fluid concrete, i.e., increase its viscosity, to reduce de-watering of the paste while it is under pressure from the pump. Among the materials used as pumping aids in concrete are organic and synthetic polymers, hydroxyethylcellulose (HEC) or HEC blended with dispersants, organic flocculents, organic emulsions of paraffin, coal tar, asphalt, acrylics, bentonite and pyrogenic silicas, natural pozzolans, fly ash and hydrated lime.

Bacteria and fungal growth on or in hardened concrete may be partially controlled through the use of fungicidal, germicidal, and insecticidal admixtures. The most effective materials for these purposes are polyhalogenated phenols, dialdrin emulsions, and copper compounds.

Fresh concrete can sometimes be harsh because of faulty mixture proportions or certain aggregate characteristics such as particle shape and improper grading. Under these conditions, entrained air which acts like a lubricant, can be used as a workability improving agent. Other workability agents are water reducers and certain finely divided admixtures.

Finely divided mineral admixtures are materials in powder or pulverized form added to concrete before or during the mixing process to improve or change some of the plastic or hardened properties of portland cement concrete. Portland cement, as used in the trade, means a hydraulic cement produced by pulverizing clinker, consisting essentially of hydraulic calcium silicates, all usually containing one or more of the forms of calcium sulfate as an interground addition with ASTM types, I, II, III, IV, or V. The finely divided mineral admixtures can be classified according to their chemical or physical properties as: cementitious materials; pozzolans; pozzolanic and cementitious materials; and nominally inert materials. Cementitious materials are materials that alone have hydraulic cementing properties, and set and harden in the presence of water. Included in cementitious materials are ground granulated blast-furnace slag, natural cement, hydraulic hydrated lime, and combinations of these and other materials. As discussed above, pozzolan is a siliceous or aluminosiliceous material that possesses little or no cementitious value but will, in the presence of water and in finely divided form, chemically react with the calcium hydroxide released by the hydration of portland cement to form materials with cementitious properties. Diatomaceous earth, opaline cherts, clays, shales, fly ash, silica fume, volcanic tuffs and pumicites are some of the known pozzolans. Certain ground granulated blast-furnace slags and high calcium fly ashes possess both pozzolanic and cementitious properties. Natural pozzolan is a term of art used to define the pozzolans that occur in nature, such as volcanic tuffs, pumices, trasses, diatomaceous earths, opaline, cherts, and some shales. Nominally inert materials can also include finely divided raw quartz, dolomites, limestones, marble, granite, and others. Fly ash is defined in ASTM C-618.

In the construction field, many methods of strengthening concrete have been developed through the years. One modern method involves distributing fibers throughout a fresh concrete mixture. Upon hardening, this concrete is referred to as fiber-reinforced concrete. Fibers can be made of zirconium materials, carbon, steel, fiberglass, or synthetic materials, e.g., polypropylene, nylon, polyethylene, polyester, rayon, high-strength aramid, or mixtures thereof.

The shrinkage reducing agent which can be used in the present invention can include but is not limited to alkali metal sulfate, alkaline earth metal sulfates, alkaline earth oxides, preferably sodium sulfate and calcium oxide. TETRAGUARD® shrinkage compensation agent is preferred and is available from Master Builders Inc. of Cleveland, Ohio.

Alkali-reactivity reducers can reduce the alkali-aggregate reaction and limit the disruptive expansion forces in hardened concrete. Pozzolans (fly ash, silica fume), blast-furnace slag, salts of lithium and barium are especially effective.

Bonding admixtures are usually added to portland cement mixtures to increase the bond strength between old and new concrete and include organic materials such as rubber, polyvinyl chloride, polyvinyl acetate, acrylics, styrene butadiene copolymers, and other powdered polymers.

Natural and synthetic admixtures are used to color concrete for aesthetic and safety reasons. These coloring admixtures are usually composed of pigments and include carbon black, iron oxide, phthalocyanine, umber, chromium oxide, titanium oxide and cobalt blue.

The term air entrainer includes any chemical that will entrain air in cementitious compositions. Air entrainers can also reduce the surface tension of a composition at low concentration. Air-entraining admixtures are used to purposely entrain microscopic air bubbles into concrete. Air-entrainment dramatically improves the durability of concrete exposed to moisture during cycles of freezing and thawing. In addition, entrained air greatly improves a concrete's resistance to surface scaling caused by chemical deicers. Air entrainment also increases the workability of fresh concrete while eliminating or reducing segregation and bleeding. Materials used to achieve these desired effects can be selected from wood resin, sulfonated lignin, petroleum acids, proteinaceous material, fatty acids, resinous acids, alkylbenzene sulfonates, sulfonated hydrocarbons, vinsol resin, anionic surfactants, cationic surfactants, nonionic surfactants, natural rosin, synthetic rosin, an inorganic air entrainer, synthetic detergents, and their corresponding salts, and mixtures thereof. Air entrainers are added in an amount to yield a desired level of air in a cementitious composition. Generally, the amount of air entrainers (about 5% to about 15% solids content) in a cementitious composition ranges from about 0.2 to about 6.0 fluid ounces per hundred pounds of dry cement. The preferred dosage is about 0.5 to about 1.5 fluid ounces per hundred pounds of dry cement. Weight percentages of the primary active ingredient of the air entrainers, wherein the primary active ingredient in the air entrainer provides the desired effect i.e., entrapment of air in the cementitious composition, are about 0.001% to about 0.05%; based on the weight of dry cementitious material. But this can vary widely due to variations in materials, mix proportion, temperature, and mixing action. The air entrainer useful in the present invention can be any known air entrainer for cement, including natural resin, synthetic resin, and mixtures thereof. Examples of air entrainers preferably utilized in the present invention include, but are not limited to MB AE 90 and MICRO AIR®, both available from Master Builders Inc. of Cleveland, Ohio.

A method is provided for preparing a cementitious composition which has acceptable workability and high early compressive and flexural strength. The process includes forming the inventive high-strength cementitious mixture, typically with a high cementitious content and low water to cementitious materials ratio, with the combination of polycarboxylate high range water reducing dispersant admixture, and both accelerating and hydration control (retarding) additives. Additionally, other additives such as those used to control excessive shrinkage and/or alkali-silica reaction, could be employed as needed. The cementitious composition therefore contains the early high strength combination admixture system of the invention and a hydraulic cement, such as portland cement, mixed with water and other additives, as desired.

In one embodiment, the high early-strength cementitious mixture may have a minimum total cementitious materials content of 650 lb/yd$^3$. The water-to-cementitious materials ratio may be generally about 0.25 to about 0.4, but preferably about 0.28 to about 0.36. In one embodiment, a reactive Type III cement would be used. It would also be possible to achieve very rapid strength development using a Type I cement, especially one that contained high amounts of tricalcium aluminate. To control shrinkage and minimize water demand, a larger coarse aggregate topsize and greater amount of coarse aggregate would be preferred. To minimize the likelihood of alkali-silica reaction (ASR) or sulfate attack, fly ash, ground granulated blast furnace slag, metakaolin and/or silica fume could be used in the cementitious mixture.

In another embodiment, the high early-strength cementitious mixture containing the combination admixture system provides about 400 pounds per square inch (psi) flexural strength and about 2,200 psi compressive strength in about 4 hours after placement at temperatures from about 50 degrees Fahrenheit to about 100 degrees Fahrenheit. The mixture is workable for about 30 minutes and provides a smooth finish. It can also be used for bridgework in that it has about an 8 inch slump and can utilize a non-chloride accelerator, which is important for corrosion resistance.

In a further embodiment of the invention, the high-strength cementitious composition containing the combination admixture system provides enhanced crack resistance due to its tensile creep. Concrete becomes susceptible to cracking as it shrinks, but the tensile creep of the present invention allows the concrete to deform over time, resisting the concrete's propensity to crack. Tensile creep is a very desirable property for concrete used in high tension stress applications such as freeways and airport runways.

Examples of an inventive high early-strength cementitious mortar composition made by the method of the invention were tested for flexural and compressive strength development. In mixtures 1–8 listed in Table 1, the cementitious composition included a polycarboxylate high range water reducing dispersant, particularly GLENIUM® 3030NS or GLENIUM® 3200 HES dispersants, and POZZOLITH® NC534 accelerator and a retarder, namely DELVO® hydration control admixture, were present or absent as reported in Table 1. The results of flexural and compressive strength at 4-, 6-, and 24-hours using ASTM test methods are set forth in Table 2 below.

TABLE 1

| MIX | ADMIX. | Dispersant (oz/ctw) | Accelerator (oz/cwt) | Retarder (oz/cwt) | CARBON FIBERS |
|---|---|---|---|---|---|
| 1 | HES | 21 | 0 | 2 | yes |
| 2 | HES | 19 | 50 | 0 | no |
| 3 | NS | 22 | 50 | 2 | no |
| 4 | NS | 25 | 0 | 0 | yes |
| 5 | NS | 23 | 0 | 2 | no |
| 6 | HES | 20 | 50 | 2 | yes |
| 7 | NS | 20 | 50 | 2 | yes |
| 8 | HES | 21 | 0 | 0 | no |

*All mixes were applied at an ambient temperature of 70 degrees Fahrenheit
HES = GLENIUM ® 3200 HES (polycarboxylate high range water reducing dispersant)
NS = GLENIUM ® 3030 NS (polycarboxylate high range water reducing dispersant)
Accelerator (50 fluid oz's/100 lbs portland cement)
Retarder (2 fluid oz's/100 lbs portland cement)

Mixtures 1–12 utilized portland cement (6.3 lbs with a water/cement ratio of 0.25).

TABLE 2

| | FLEX STRENGTH ASTM C348 | | | COMP STRENGTH ASTM C39 | | |
|---|---|---|---|---|---|---|
| MIX | 4 hr C 348 | 6 hr C 348 | 24 hr C 348 | 4 hr C 109 | 6 hr C 109 | 24 hr C 109 |
| 1 | 250 | 791 | 2685 | 324 | 2700 | 10975 |
| 2 | 1018 | 1656 | 1995 | 3805 | 6350 | 12488 |
| 3 | 535 | 1031 | 2538 | 2513 | 4775 | 10800 |
| 4 | 0 | 267 | 2459 | — | 303 | 10025 |
| 5 | 0 | 97 | 2007 | — | 180 | 11700 |
| 6 | 475 | 1163 | 2306 | 1620 | 4513 | 12188 |
| 7 | 546 | 705 | — | 1722 | 4063 | 9975 |
| 8 | 70 | 420 | — | 174 | 1088 | 11750 |

As illustrated by the results in Table 2, the cementitious composition of the present invention eliminates the necessity of using rapid set cements in applications that require an early high strength set. When the accelerator and retarder were combined with the polycarboxylate high range water reducing dispersant, an early high flexural strength of over 400-psi was achieved. This early flexural strength result is coupled with a higher flexural strength at 24 hours than is achieved with use of the accelerator alone without the polycarboxylate high range water reducing dispersant. Additionally, it should be noted that when the retarder is not added to the cementitious composition a very high initial flexural strength is achieved (mixture 2). However, the workability of the composition was lower than that of the mixtures containing the retarder, leading to undesirable placement characteristics (i.e. the mixture stiffened too quickly to be placed). Further, the long term flexural strength of the composition is increased by the addition of the retarder with the accelerator and polycarboxylate high range water reducing dispersant—(mixture 3) with flexural strength of 2,538 psi at 24 hours compared to (mixture 2) with flexural strength of 1,995 psi at 24 hours. When an accelerator is not added, the early strength development is reduced (mixtures 1, 4, 5, and 8).

In mixtures 9–12 listed in Table 3, the cementitious compositions were made with Portland cement and included a polycarboxylate high range water reducing dispersant, particularly GLENIUM® 3030NS or GLENIUM® 3200 HES dispersants, an air entrainer sold under the trademark MB AE 90, RHEOCRETE® CNI accelerator, and a retarder, namely DELVO® hydration control admixture. (All admixture components are available from Master Builders Inc., Cleveland, Ohio.) The mixtures were tested for initial set time in hours at an ambient temperature of about 73 degrees Fahrenheit to about 75 degrees Fahrenheit and with a water to cementitious materials ratio (W:C) of about 0.25 to about 0.28.

TABLE 3

| Mix | W:C | Type I/II Cement lb/yd³ | #67 Limestone lb/yd³ | Sand lb/yd³ | Water lb/yd³ | Retarder oz/cwt | MBAE-90 oz/cwt | CNI oz/cwt | HRWR | HRWR oz/cwt |
|---|---|---|---|---|---|---|---|---|---|---|
| 9 | 0.28 | 850 | 1900 | 1025 | 287 | 0.75 | 0.5 | 90 | NS | 10.0 |
| 10 | 0.25 | 850 | 1900 | 1091 | 273 | 0.75 | 1.2 | 90 | NS | 12.4 |

TABLE 3-continued

| Mix | W:C | Type I/II Cement lb/yd$^3$ | #67 Limestone lb/yd$^3$ | Sand lb/yd$^3$ | Water lb/yd$^3$ | Retarder oz/cwt | MBAE-90 oz/cwt | CNI oz/cwt | HRWR | HRWR oz/cwt |
|---|---|---|---|---|---|---|---|---|---|---|
| 11 | 0.28 | 850 | 1900 | 1025 | 287 | 0.75 | 0.5 | 90 | HES | 6.3 |
| 12 | 0.25 | 850 | 1900 | 1092 | 273 | 0.75 | 0.8 | 90 | HES | 7.6 |

HES = GLENIUM ® 3200 HES (polycarboxylate high range water reducing dispersant)
NS = GLENIUM ® 3030 NS (polycarboxylate high range water reducing dispersant)
CNI = Rheocrete ® CNI (accelerator; fluid oz's/100 lbs portland cement)
Retarder = DELVO ® (fluid oz's/100 lbs portland cement)
Limestone #67 = ASTM #67 coarse aggregate

TABLE 4

| Mix | Unit Weight lb/ft$^3$ | Air % | Slump, inches | 5-Hr. Compressive Strength psi | 6-Hr. Compressive Strength psi | 7-Hr Compressive Strength psi | 5-Hr. Flexural Stength |
|---|---|---|---|---|---|---|---|
| 9 | 147.2 | 5.0 | 8.75 | 4602 | 4839 | 5414 | 370 |
| 10 | 147.0 | 6.4 | 8.0 | 4466 | 5131 | 5988 | 400 |
| 11 | 141.0 | 9.2 | 8.75 | 3977 | 4701 | 5255 | 425 |
| 12 | 142.4 | 9.0 | 5.75 | 5001 | 5748 | — | 510 |

It should be noted that the mixtures in Tables 3 and 4 were tested at set times following mixing. This differs from measuring strength development after placement in that the placement itself takes about 1 hour (transport, discharge and placement time). Therefore, to simulate 4 hours after placement the mixtures were tested 5 hours after mixing for strength. To test for continued strength development, compressive strength was assessed at 6 and 7 hours after mixing.

Table 4 demonstrates that the cementitious mixtures prepared according to the invention (accelerator, dispersant, and retarder) developed over 400 psi flexural strength five hours after mixing with an average flexural strength of 426.25 psi, with one mixture (12) attaining a strength of 510 psi. Further, the invention developed high early compressive strength with an average strength of 4,511.5 psi at five hours and 5,104.75 psi at six hours. These results demonstrate the inventive mixture develops high early flexural and compressive strength within a short time after mixing.

TABLE 5

| Mix | Air entrainer | Dispersant | Air Content, % | Water: Cement Ratio | 5-Hour Compressive Strength, psi | 7-Hour Compressive Strength, psi | 5-Hour Flexural Strength, psi | 7-Hour Flexural Strength, psi |
|---|---|---|---|---|---|---|---|---|
| 13 | none | Glenium 3200 HES | 1.1 | 0.31 | 3470 | 5150 | 525 | 645 |
| 14 | none | Glenium 3030 NS | 1.3 | 0.31 | 2050 | 4130 | 400 | 595 |
| 15 | 5.2% (MB AE-90) | Glenium 3030 NS | 5.2 | 0.31 | 2140 | 3940 | 410 | 545 |
| 16 | 6.4% (Micro Air) | Glenium 3200 HES | 6.4 | 0.31 | 2430 | 4050 | 425 | 545 |

HES = GLENIUM ® 3200 HES (polycarboxylate high range water reducing dispersant)
NS = GLENIUM ® 3030 NS (polycarboxylate high range water reducing dispersant)

In mixtures 13–16 listed in Table 5 the cementitious compositions were made with portland cement and include a polycarboxylate high range water reducing dispersant, particularly GLENIUM® 3030NS or GLENIUM® 3200 HES dispersants, air entrainers MB AE 90 and MICRO AIR®, POZZOLITH® NC534 accelerator or RHEO-CRETE® CNI accelerator, a retarder, namely DELVO® hydration control admixture, and TETRAGUARD® shrinkage reducing admixture. The mixes were tested for initial set time in hours at an ambient temperature of about 70 degrees Fahrenheit with a water to cementitious materials ratio (W:C) of about 0.31. Table 5 further demonstrates that the composition made according to the invention can reach high early strength with an average flexural and compressive strength of 440 psi and 2,522.5 psi, within five hours after mixing (four hours after placement). It further shows that the addition of an air entrainer (useful where pavement undergoes several freeze-thaw cycles) and the consequential entrainment of air to the mixture does not affect high early-strength generation, in that the mixtures with an air retainer (15 and 16) developed the same flexural and compressive strength as those without (13 and 14).

TABLE 6

| Mix | NC 534 oz/cwt | Delvo, oz/cwt | Mini-Slump, inches | Age, minutes |
|---|---|---|---|---|
| 17 | 90 | 0 | 2 | 5 |
| 17 | 90 | 0 | 3.75 | 10 |

TABLE 6-continued

| Mix | NC 534 oz/cwt | Delvo, oz/cwt | Mini-Slump, inches | Age, minutes |
|---|---|---|---|---|
| 17 | 90 | 0 | 2.25 | 15 |
| 17 | 90 | 0 | 1.25 | 20 |
| 17 | 90 | 0 | 0.75 | 25 |
| 18 | 90 | 3 | 3.25 | 5 |
| 18 | 90 | 3 | 4 | 10 |

TABLE 6-continued

| Mix | NC 534 oz/cwt | Delvo, oz/cwt | Mini-Slump, inches | Age, minutes |
|---|---|---|---|---|
| 18 | 90 | 3 | 2.75 | 15 |
| 18 | 90 | 3 | 1.5 | 20 |
| 18 | 90 | 3 | 1 | 25 |

Mixtures 17 and 18 in Table 6 were made with portland cement and include a polycarboxylate high range water reducing dispersant, particularly GLENIUM® 3030NS dispersant, POZZOLITH® NC534 accelerator, and a retarder, in mixture 18 namely DELVO® hydration control admixture, and were tested using the Mini-Slump test with a 6 inch slump cone at temperatures between 76 and 79 degrees Fahrenheit. In that test, the cone is filled in three approximately equal layers; the bottom layer is rodded throughout its depth; the second and top layers are each rodded throughout their depth so that the strokes just penetrate into the next lower layer; the top layer is covered in mortar; the cone is removed from the mortar and immediately the "slump" is measured by determining the difference between the height of the cone and the height of the original center of the base of the specimen.

The tests of Mixtures 17 and 18 began with mixtures having 12 oz/cwt of Glenium 3030® NS, with 2 oz/cwt Glenium® 3030 NS added after the 5 minute slump measurement. The results demonstrate the higher slump of Mixture 18 which contains retarder as compared to Mixture 17 which does not. The higher slump value of mixture 18, 4 inches at 10 minutes and 1 inch at 25 minutes, as compared to 3.75 inches and 0.75 inch for Mixture 17, shows the increased workability of the present invention over using accelerator and dispersant alone. The increased workability allows for better placement of the cementitious composition mixture and reduces the chances of a premature set. Further, the results illustrate the effect of the dispersant on workability, in that after the dispersant was added to the mixtures (after 5 minutes) the slump measurement increased from 2 inches at 5 minutes to 3.75 inches at 10 minutes for Mixture 17 and from 3.25 inches at 5 minutes to 4 inches at 10 minutes for Mixture 18. It should be noted however that after adding the dispersant to Mixture 17 the slump increased almost two fold from 2 inches to 3.75 inches, whereas in Mixture 18 the increase was about 12 percent. This indicates that in Mixture 18 there was already improved workability due to the presence of retarder, as shown by the smaller increase in slump, and that raising the level of dispersant only added to the enhanced workability effect that was already present.

Table 7 contains data from 800 cubic yards of concrete placed as pavement panels. All samples contained the high early-strength admixture which comprises accelerator, retarder and polycarboxylate high range water reducing dispersant. The initial placed internal temperature of the concrete slabs was 82 to 85 degrees Fahrenheit, with the internal temperature in the slabs peaking at approximately 127 to 129 degrees Fahrenheit in 4–5 hours after placement. Air temperature ranged from 62 to 66 degrees Fahrenheit. All samples developed a flexural strength of 400 psi (2.8 MPa) and a compressive strength of at least 3,350 within four hours after placement. Further, the concrete in the samples was very workable and finishable, resulting in smooth broomed and tined panels with no cracking.

It should be appreciated that the present invention is not limited to the specific embodiments described above, but includes variations, modifications and equivalent embodiments defined by the following.

We claim:

1. A composition of admixtures for cementitious compositions comprising:
   a) a polycarboxylate high range water reducing dispersant;
   b) an accelerator; and
   c) a retarder;
   which in combination provides the cementitious compositions with flexural strength of at least 400 pounds per square inch and compressive strength of at least 2,200 pounds per square inch within 4 hours after placement.

2. The composition of claim 1 wherein the composition of admixtures is chloride-free.

3. The composition of claim 1, wherein the accelerator comprises at least one of:
   a) a nitrate salt of an alkali metal, alkaline earth metal, or aluminum;
   b) a nitrite salt of an alkali metal, alkaline earth metal, or aluminum;
   c) a thiocyanate of an alkali metal, alkaline earth metal or aluminum;
   d) an alkanolamine;
   e) a thiosulphate of an alkali metal, alkaline earth metal, or aluminum;
   f) a hydroxide of an alkali metal, alkaline earth metal, or aluminum;
   g) a carboxylic acid salt of an alkali metal, alkaline earth metal, or aluminum;
   h) a polyhydroxylalkylamine; or
   i) a halide salt of an alkali metal or alkaline earth metal.

4. The composition of claim 1 wherein the retarder is selected from the group consisting of an oxy-boron compound, lignin, a polyphosphonic acid, a carboxylic acid,

TABLE 7

| Mix | Cubic Yards Poured | 3-Hour Flexural Strength, psi | 4-Hour Flexural Strength, psi | 7-Day Flexural Strength, psi | 3-Hour Compressive Strength, psi | 4-Hour Compressive Strength, psi | 7-Day Compressive Strength, psi |
|---|---|---|---|---|---|---|---|
| 19 | 5 | 427 | 488 | 931 | 3935 | 4251 | 7615 |
| 20 | 50 | 284 | 407 | 958 | | 3382 | 7710 |
| 21 | 100 | 351 | 490 | 935 | | 3815 | 8560 |
| 22 | 107 | 392 | 473 | 910 | 3707 | 4269 | 8568 |
| 23 | 160 | | 430 | 907 | | 5115 | 8505 |
| 24 | 127 | | | 984 | | | 9398 |
| 25 | 200 | 404 | 494 | 954 | 3820 | 5790 | 7902 |
| 26 | 60 | 280 | 407 | | 2841 | 3617 | |
| 27 | | 356 | 456 | 940 | 3576 | 4320 | 8323 | a hydroxycarboxylic acid, polycarboxylic acid, hydroxylated carboxylic acid, fumaric, itaconic, malonic, borax, gluconic, and tartaric acid, lignosulfonates, ascorbic acid, isoascorbic acid, sulphonic acid-acrylic acid copolymer, and their corresponding salts, polyhydroxysilane, polyacrylamide, carbohydrates and mixtures thereof.

5. The composition of claim 1 wherein the composition of admixtures is greater than 0% to about 2% retarder; about 5% to about 12% dispersant; and about 85% to about 95% accelerator based on dry solids.

6. A high early-strength cementitious composition comprising a hydraulic cement and a composition of admixtures, said composition of admixtures in combination comprising:
 a) a polycarboxylate high range water reducing dispersant;
 b) an accelerator; and
 c) a retarder;
wherein said high early-strength cementitious composition within 4 hours after placement has a flexural strength of at least 400 pounds per square inch and compressive strength of at least 2,200 pounds per square inch.

7. The cementitious composition of claim 6 wherein the combination of admixtures composition is chloride-free.

8. The cementitious composition of claim 6, wherein the accelerator comprises at least one of:
 a) a nitrate salt of an alkali metal, alkaline earth metal, or aluminum;
 b) a nitrite salt of an alkali metal, alkaline earth metal, or aluminum;
 c) a thiocyanate of an alkali metal, alkaline earth metal or aluminum;
 d) an alkanolamine;
 e) a thiosulphate of an alkali metal, alkaline earth metal, or aluminum;
 f) a hydroxide of an alkali metal, alkaline earth metal, or aluminum;
 g) a carboxylic acid salt of an alkali metal, alkaline earth metal, or aluminum;
 h) a polyhydroxylalkylamine; or
 i) a halide salt of an alkali metal or alkaline earth metal.

9. The cementitious composition of claim 6 wherein the retarder is selected from the group consisting of an oxyboron compound, lignin, a polyphosphonic acid, a carboxylic acid, a hydroxycarboxylic acid, polycarboxylic acid, hydroxylated carboxylic acid, fumaric, itaconic, malonic, borax, gluconic, and tartaric acid, lignosulfonates, ascorbic acid, isoascorbic acid, sulphonic acid-acrylic acid copolymer, and their corresponding salts, polyhydroxysilane, polyacrylamide, carbohydrates and mixtures thereof.

10. The cementitious composition of claim 6 wherein the combination of admixtures is greater than 0% to about 2% retarder; about 5% to about 12% dispersant; and about 85% to about 95% accelerator based on weight of dry solids.

11. The cementitious composition of claim 6, further characterized in that the retarder and the polycarboxylate high range water reducing dispersant are added to the hydraulic cement before the accelerator.

12. The cementitious composition of claim 6, wherein the polycarboxylate high range water reducing dispersant has a solids content of about 20 percent to about 30 percent and is present in an amount from about 2 to about 35 oz/cwt; the retarder has a solids content of about 10 percent to about 20 percent and is present in an amount of greater than zero to about 6 oz/cwt; and the accelerator has a solids content of about 30 percent to about 50 percent and is present in an amount of about 20 to about 120 oz/cwt; based on the dry weight of the cementitious material.

13. The cementitious composition of claim 6, wherein the polycarboxylate high range water reducing dispersant has a solids content of about 20 percent to about 30 percent and is present in an amount from about 10 to about 25 oz/cwt; the retarder has a solids content of about 10 percent to about 20 percent and is present in an amount of about 0.1 to about 5 oz/cwt; and the accelerator has a solids content of about 30 percent to about 50 percent and is present in an amount of about 60 to about 120 oz/cwt; based on the dry weight of the cementitious material.

14. The cementitious composition of claim 6, wherein the primary active ingredient of the polycarboxylate high range water reducing dispersant is about 0.027 percent to about 0.68 percent; the primary active ingredient of the retarder is about 0.002 percent to about 0.053; and, the primary active ingredient of the accelerator is about 0.018 percent to about 2.03; per 100 pounds of dry cementitious material.

15. The cementitious composition of claim 6, wherein an air entrainer is present in an amount of about 0.2 oz/cwt to about 6 oz/cwt based on the dry weight of the solids.

16. The cementitious composition of claim 6 wherein the hydraulic cement is portland cement.

17. The cementitious composition of claim 6 further including at least one of silica fume, metakaolin, fly ash, calcined clay, or granulated blast furnace slag.

18. The cementitious composition of claim 6 further comprising a cement admixture or additive that is selected from the group consisting of air detraining agent, foaming agent, corrosion inhibitor, shrinkage compensation agent, fiber, pigment, pozzolan, clay, strength enhancing agents, rheology modifying agents, water repellents, wetting agents, water soluble polymers, dampproofing admixtures, gas formers, permeability reducers, pumping aids, fungicidal admixtures, germicidal admixtures, insecticidal admixtures, finely divided mineral admixtures, alkali-reactivity reducer, bonding admixtures, aggregate and mixtures thereof.

19. The composition of claim 1 or 6 wherein the polycarboxylate high range water reducing dispersant is at least one selected from the group consisting of:
 a) a dispersant of Formula (I)

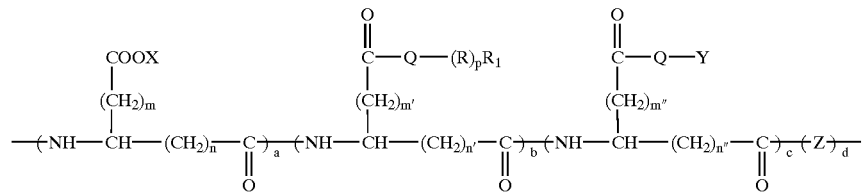

wherein in Formula (I)
 X is selected from the group consisting of hydrogen, an alkali earth metal ion, an alkaline earth metal ion, ammonium ion, and amine;
 R is selected from the group consisting of $C_1$ to $C_6$ alkyl(ene) ether and mixtures thereof and $C_1$ to $C_6$ alkyl(ene) imine and mixtures thereof;

Q is selected from the group consisting of oxygen, NH, and sulfur;

p is a number from 1 to about 300 resulting in at least one of a linear side chain and branched side chain;

$R_1$ is selected from the group consisting of hydrogen, $C_1$ to $C_{20}$ hydrocarbon, and functionalized hydrocarbon containing at least one of —OH, —COOH, an ester or amide derivative of —COOH, sulfonic acid, an ester or amide derivative of sulfonic acid, amine, and epoxy;

Y is selected from the group consisting of hydrogen, an alkali earth metal ion, an alkaline earth metal ion, ammonium ion, amine, a hydrophobic hydrocarbon and polyalkylene oxide moiety;

m, m', m", n, n', and n" are each independently 0 or an integer between 1 and about 20;

Z is a moiety containing at least one compound selected from the group consisting of i) at least one amine and one acid group, ii) two functional groups capable of incorporating into the backbone selected from the group consisting of dianhydrides, dialdehydes, and di-acid-chlorides, and iii) an imide residue; and wherein a, b, c, and d reflect the mole fraction of each unit wherein the sum of a, b, c, and d equal one, wherein a, b, c, and d are each a value greater than or equal to zero and less than one, and at least two of a, b, c, and d are greater than zero;

b) a dispersant of Formula (II)

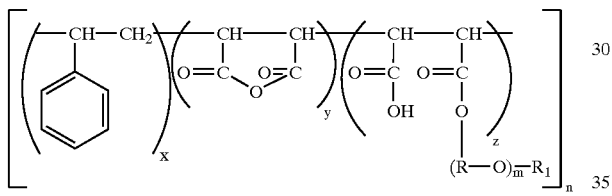

wherein in Formula (II):
R is a $C_{2-6}$ alkylene radical;
$R_1$ is a $C_{1-20}$ alkyl, $C_{6-9}$ cycloalkyl or phenyl group;
x, y, and z are numbers from 0.01 to 100;
m is a number from 1 to 100; and
n is a number from 10 to 100;
optionally wherein, the ratio of x to (y+z) is from 1:10 to 10:1 inclusive, the ratio of z:y is from 3:1 to 100:1, and m+n=15–100;

c) a dispersant of Formula (III)

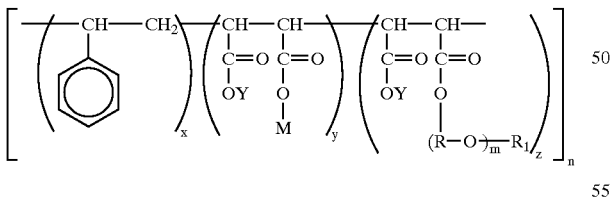

wherein in Formula (III):
M is hydrogen or the residue of a hydrophobic polyalkylene glycol or polysiloxane;
Y is hydrogen, an alkali or alkaline earth metal ion, ferrous ion, aluminum ion, (alkanol)ammonium ion, or (alkyl)ammonium ion;
R is a $C_{2-6}$ alkylene radical;
$R_1$ is a $C_{1-20}$ alkyl, $C_{6-9}$ cycloalkyl, or phenyl group;
x, y, and z are numbers from 1 to 100;
optionally wherein, the ratio of a to (b+c) is from 1:10 to 10:1 inclusive, the ratio of c:b is from 5:1 to 100:1, and m+n=15–100;

d) a dispersant comprising at least one polymer or a salt thereof having the form of a copolymer of
  i) a maleic anhydride half-ester with a compound of the formula $RO(AO)_mH$, wherein R is a $C_1$–$C_{20}$ alkyl group, A is a $C_{2-4}$ alkylene group, and m is an integer from 2–16; and
  ii) a monomer having the formula $CH_2$=$CHCH_2$—$(OA)_nOR$, wherein n is an integer from 1–90 and R is a $C_{1-20}$ alkyl group;

e) a reaction product formed by reacting a polycarboxylic acid with a nitrogeneous acrylic polymer;

f) a dispersant obtained by copolymerizing about 5 to about 98% by weight of an (alkoxy)polyalkylene glycol mono(meth)acrylic ester monomer (a) represented by the following general formula (f1):

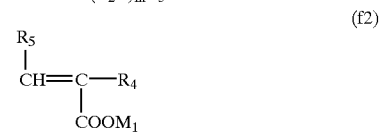

wherein $R_1$ is hydrogen or a methyl group, $R_2O$ is one species or a mixture of two or more species of oxyalkylene group of 2 to 4 carbon atoms, providing two or more species of the mixture may be added either in the form of a block or in a random form, $R_3$ is hydrogen or an alkyl group of 1 to 5 carbon atoms, and m is a value indicating the average addition mol number of oxyalkylene groups that is an integer in the range of 1 to 100; about 95% to about 2% by weight of a (meth)acrylic acid monomer (b) represented by the above general formula (f2), wherein $R_4$ and $R_5$ are each independently hydrogen or a methyl group, and $M_1$ is hydrogen, a monovalent metal atom, a divalent metal atom, an ammonium group, or an organic amine group; and, 0 to about 50% by weight of a monomer (c) copolymerizable with monomers (a) and (b), provided that the total amount of (a), (b), and (c) is 100% by weight;

g) a graft polymer that is a polycarboxylic acid or a salt thereof, having side chains derived from at least one species selected from the group consisting of oligoalkyleneglycols, polyalcohols, polyalkylene glycols, and mixtures thereof;

h) a styrene-maleic anhydride copolymer in free acid or salt form, wherein the copolymer consists of the following monomers and numbers of monomer units:

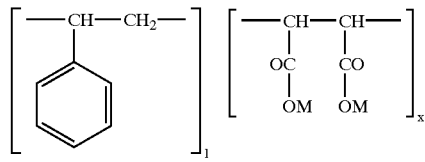

-continued

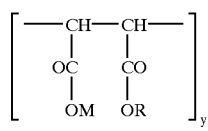

wherein:

M is selected from hydrogen, a cation and a residue of a hydrophobic polyalkylene glycol or polysiloxane;

R is the residue of a methylpoly(ethylene) glycol of weight average molecular weight 900–2000;

x=0.35–0.75; and y=0.25–0.65;

i) a dispersant of Formula (IV):

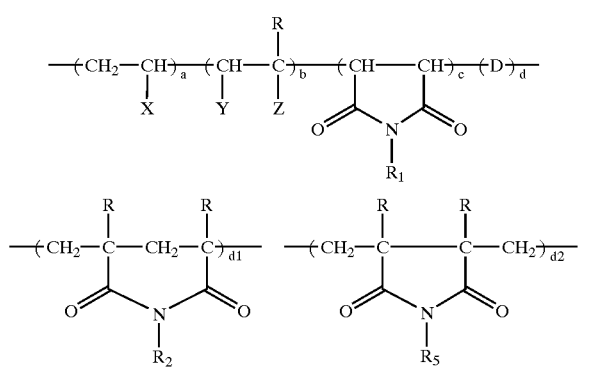

wherein in Formula (IV):

D=a component selected from the group consisting of the structure d1, the structure d2, and mixtures thereof;

X=H, $CH_3$, $C_2$ to $C_6$ Alkyl, Phenyl, Substituted Phenyl;

Y=H, —COOM;

R=H, $CH_3$;

Z=H, —$SO_3M$, —$PO_3M$, —COOM, —$OR_3$, —$COOR_3$, —$CH_2OR_3$, —$CONHR_3$, —CONHC$(CH_3)_2$ $CH_2SO_3M$, —COO$(CHR_4)_n$OH where n=2 to 6;

$R_1$, $R_2$, $R_3$, $R_1$ are each independently —$(CH_2CHRO)_m R_4$ random copolymer of oxyethylene units and oxypropylene units where m=10 to 500 and wherein the amount of oxyethylene in the random copolymer is from about 60% to 100% and the amount of oxypropylene in the random copolymer is from 0% to about 40%;

$R_4$=H, Methyl, $C_2$ to $C_6$ Alkyl;

M=Alkali Metal, Alkaline Earth Metal, Ammonia, Amine, Substituted Amine, Methyl, $C_2$ to $C_6$ Alkyl;

a=0–0.8;

b=0.2–1.0;

c=0–0.5;

d=0–0.5; and wherein a, b, c, and d represent the mole fraction of each unit and the sum of a, b, c, and d is 1.0;

j) a dispersant of Formula (V): wherein in Formula (V):

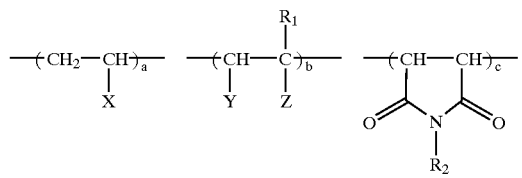

the "b" structure is one of a substituted carboxylic acid monomer, an ethylenically unsaturated monomer, and maleic anhydride wherein an acid anhydride group (—CO—O—CO—) is formed in place of the groups Y and Z between the carbon atoms to which the groups Y and Z are bonded respectively, and the "b" structure must include at least one moiety with a pendant ester linkage and at least one moiety with a pendant amide linkage;

X=H, $CH_3$, $C_2$ to $C_6$ Alkyl, Phenyl, or Substituted Phenyl;

Y=H, —COOM, —COOH, or W;

W=a hydrophobic defoamer represented by the formula $R_5O—(CH_2CH_2O)_s—(CH_2C(CH_3)HO)_t—(CH_2CH_2O)_u$ where s, t, and u are integers from 0 to 200 with the proviso that t>(s+u) and wherein the total amount of hydrophobic defoamer is present in an amount less than about 10% by weight of the derivatized polycarboxylate high range water reducing dispersant;

Z=H, —COOM, —$OR_3$, —$COOR_3$, —$CH_2OR_3$, or —$CONHR_3$;

$R_1$ H, or $CH_3$;

$R_2$, $R_3$, are each independently a random copolymer of oxyethylene units and oxypropylene units of the general formula —$(CH(R_1)CH_2O)_m R_4$ where m=10 to 500 and wherein the amount of oxyethylene in the random copolymer is from about 60% to 100% and the amount of oxypropylene in the random copolymer is from 0% to about 40%;

$R_4$=H, Methyl, or $C_2$ to $C_8$ Alkyl;

$R_5$=$C_1$ to $C_{18}$ alkyl or $C_6$ to $C_{18}$ alkyl aryl;

M=Alkali Metal, Alkaline Earth Metal, Ammonia, Amine, mono, di or tri alkyl substituted amine, unsaturated cyclic amine, or saturated cyclic amine;

a=0.01–0.8;

b=0.2–0.99;

c=0–0.5; and wherein a, b, c represent the mole fraction of each unit and the sum of a, b, and c, is 1;

k) a random copolymer corresponding to the following Formula (VI) in free acid or salt form having the following monomers and numbers of monomer units:

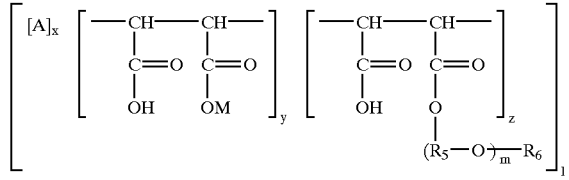

wherein A is selected from the moieties (i) and (ii)

(i) —$CR_1R_2$—$CR_3R_4$—

(ii)

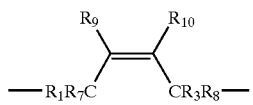

wherein $R_1$ and $R_3$ are selected from substituted benzene, $C_{1-8}$ alkyl, $C_{2-8}$ alkenyl, $C_{2-8}$ alkylcarbonyl, $C_{1-8}$ alkoxy, carboxyl, and hydrogen, or $R_1$ and $R_3$ can together with $R_2$ and/or $R_4$ form a ring; and $R_2$ and $R_4$ are selected from the group consisting of hydrogen and $C_{1-4}$ alkyl;

$R_7$, $R_8$, $R_9$, and $R_{10}$ are individually selected from the group consisting of hydrogen, $C_{1-6}$ alkyl, or $R_1$ and $R_3$ together with $R_7$ and/or $R_8$, $R_9$, and $R_{10}$ form a continuous $C_{2-8}$ hydrocarbon chain joining the carbon atoms to which they are attached, the hydrocarbon chain optionally having at least one anionic group;

M is selected from the group consisting of hydrogen, and the residue of a hydrophobic polyalkylene glycol or a polysiloxane, with the proviso that when A is (ii) and M is the residue of a hydrophobic polyalkylene glycol, M must be different from the group $-(R_{50})_m R_6$;

$R_5$ is a $C_{2-8}$ alkylene radical;

$R_6$ is selected from the group consisting of $C_{1-20}$ alkyl, $C_{6-9}$ cycloalkyl and phenyl;

n, x, and z are numbers from 1 to 100;

y is 0 to 100;

m is 2 to 1000;

the ratio of x to (y+z) is from 1:10 to 10:1 and the ratio of y:z is from 5:1 to 1:100;

l) a copolymer Formula (VII) based on oxyalkyleneglycol-alkenyl ethers and unsaturated dicarboxylic acid derivatives, comprising:

i) 10 to 90 mol % of component of the formula Ia and/or Ib:

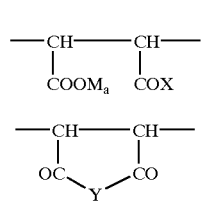

wherein;

M is a hydrogen atom, a mono- or divalent metal cation, an ammonium ion, an organic amine residue, or a divalent metal cation;

a is 1, when M is a hydrogen atom, a mono- or divalent metal cation, an ammonium ion or an organic amine residue;

a is ½, when M is a divalent metal cation;

X is $-OM_a$, $-O-(C_mH_{2m}O)_n-R_1$, in which $R_1$ is a hydrogen atom, an aliphatic hydrocarbon radical containing from 1 to 20 carbon atoms, a cycloaliphatic hydrocarbon radical containing 5 to 8 carbon atoms or an optionally hydroxyl, carboxyl, or sulphonic substituted aryl radical containing 6 to 14 carbon atoms, m is 2 to 4, n is 0 to 100, $-NHR_2$ and/or $-N(R_2)_2$, in which $R_2=R_1$ or $-CO-NH_2$, and;

Y is an oxygen atom or $-NR_2$;

ii) 1 to 89 mol % of components of the general formula:

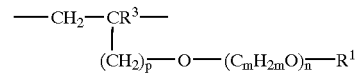

wherein $R_3$ is a hydrogen atom or an aliphatic hydrocarbon radical containing from 1 to 5 carbon atoms, p is 0 to 3, and $R_1$ is hydrogen, an aliphatic hydrocarbon radical containing from 1 to 20 carbon atoms, a cycloaliphatic hydrocarbon radical containing 5 to 8 carbon atoms or an optionally hydroxyl, carboxyl, or sulfonic substituted aryl radical containing 6 to 14 carbon atoms, m is 2 to 4, and n is 0 to 100, and iii) 0.1 to 10 mol % of components of the general formulae:

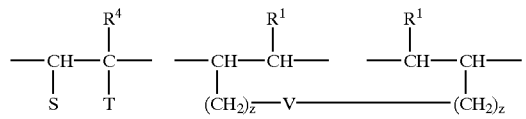

wherein S is a hydrogen atom or $-COOM_a$ or $-COOR_5$, T is $-COOR_5$, $-W-R_7$, $-CO-[-NH-(CH2)3)-]_s$, $-W-R_7$, $-CO-O-(CH_2)_z-W-R_7$, a radical of the general formula:

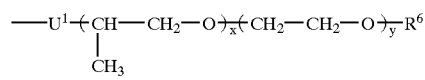

or $-(CH_2)_z-V-(CH_2)_z-CH=CH-R_1$, or when S is $-COOR_5$ or $-COOM_a$, $U_1$ is $-CO-NHM-$, $-O-$ or $-CH_2O$, $U_2$ is $-NH-CO-$, $-O-$ or $-OCH_2$, V is $-O-CO-C_6H_4-CO-O-$ or $-W-$, and W is

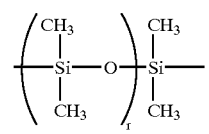

R4 is a hydrogen atom or a methyl radical, R5 is an aliphatic hydrocarbon radical containing 3 to 20 carbon atoms, a cycloaliphatic hydrocarbon radical containing 5 to 8 carbon atoms or an aryl radical containing 6 to 14 carbon atoms, $R_6=R_1$ or

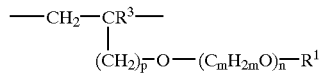

$R_7=R_1$ or

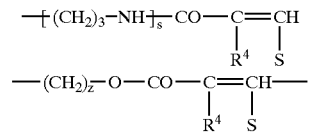

r is 2 to 100, s is 1 or 2, x is 1 to 150, y is 0 to 15 and z is 0 to 4.

20. A method for making a high early-strength cementitious composition comprising forming a mixture of water, hydraulic cement and a combination of admixtures, said composition of admixtures in combination comprising:
 a) a polycarboxylate high range water reducing dispersant;
 b) an accelerator; and
 c) a retarder;
wherein said high early-strength cementitious composition within 4 hours after placement has a flexural strength of at least 400 pounds per square inch and compressive strength of at least 2,200 pounds per square inch.

21. The method of claim 20 wherein the accelerator comprises at least one of:
 a) a nitrate salt of an alkali metal, alkaline earth metal, or aluminum;
 b) a nitrite salt of an alkali metal, alkaline earth metal, or aluminum;
 c) a thiocyanate of an alkali metal, alkaline earth metal or aluminum;
 d) an alkanolamine;
 e) a thiosulphate of an alkali metal, alkaline earth metal, or aluminum;
 f) a hydroxide of an alkali metal, alkaline earth metal, or aluminum;
 g) a carboxylic acid salt of an alkali metal, alkaline earth metal, or aluminum;
 h) a polyhydroxylalkylamine; or
 i) a halide salt of an alkali metal or alkaline earth metal.

22. The method of claim 20 wherein the retarder comprises at least one of an oxy-boron compound, lignin, a polyphosphonic acid, a carboxylic acid, a hydroxycarboxylic acid, polycarboxylic acid, hydroxylated carboxylic acid, fumaric, itaconic, malonic, borax, gluconic, and tartaric acid, lignosulfonates, ascorbic acid, isoascorbic acid, sulphonic acid-acrylic acid copolymer, and their corresponding salts, polyhydroxysilane, polyacrylamide, carbohydrates and mixtures thereof.

23. The method of claim 20 wherein the combination of admixtures is greater than 0% to about 2% retarder; about 5% to about 12% dispersant; and about 85% to about 95% accelerator based on weight of dry solids.

24. The method of claim 20, further characterized in that the retarder and the polycarboxylate high range water reducing dispersant are added to the hydraulic cement before the accelerator.

25. The method of claim 20, wherein the polycarboxylate high range water reducing dispersant has a solids content of about 20 percent to about 30 percent and is present in an amount from about 2 to about 35 oz/cwt; the retarder has a solids content of about 10 percent to about 20 percent and is present in an amount of greater than zero 0 to about 6 oz/cwt; and the accelerator has a solids content of about 30 percent to about 50 percent and is present in an amount of about 20 to about 120 oz/cwt; based on the dry weight of the cementitious material.

26. The method of claim 20, wherein the polycarboxylate high range water reducing dispersant has a solids content of about 20 percent to about 30 percent and is present in an amount from about 10 to about 25 oz/cwt; the retarder has a solids content of about 10 percent to about 20 percent and is present in an amount of about 0.1 to about 5 oz/cwt; and the accelerator has a solids content of about 30 percent to about 50 percent and is present in an amount of about 60 to about 120 oz/cwt; based on the dry weight of the cementitious material.

27. The method of claim 20, wherein the primary active ingredient of the polycarboxylate high range water reducing dispersant is about 0.027 percent to about 0.68 percent; the primary active ingredient of the retarder is about 0.002 percent to about 0.053 percent; and, the primary active ingredient of the accelerator is about 0.018 percent to about 2.03; per 100 pounds of dry cementitious material.

28. The method of claim 20, wherein an air entrainer is present in an amount of about 0.2 oz/cwt to about 6 oz/cwt based on the dry weight of the cementitious material.

29. The method of claim 20 wherein the hydraulic cement is portland cement.

30. The method of claim 20 further including in the mixture at least one of silica fume, metakaolin, fly ash, calcined clay, or granulated blast furnace slag.

31. The method of claim 20 further comprising a cement admixture or additive that is selected from the group consisting of air detraining agent, foaming agent, corrosion inhibitor, shrinkage compensation agent, fiber, pigment, pozzolan, clay, strength enhancing agents, rheology modifying agents, water repellents, wetting agents, water soluble polymers, dampproofing admixtures, gas formers, permeability reducers, pumping aids, fungicidal admixtures, germicidal admixtures, insecticidal admixtures, finely divided mineral admixtures, alkali-reactivity reducer, bonding admixtures, aggregate and mixtures thereof.

32. A method for making a high early-strength cementitious composition comprising forming a mixture of water and the composition of claim 19, wherein said high early-strength cementitious composition within 4 hours after placement has a flexural strength of at least 400 pounds per square inch and compressive strength of at least 2,200 pounds per square inch.

33. The method of claim 32 wherein the accelerator comprises at least one of:
 a) a nitrate salt of an alkali metal, alkaline earth metal, or aluminum;
 b) a nitrite salt of an alkali metal, alkaline earth metal, or aluminum;
 c) a thiocyanate of an alkali metal, alkaline earth metal or aluminum;
 d) an alkanolamine;
 e) a thiosulphate of an alkali metal, alkaline earth metal, or aluminum;
 f) a hydroxide of an alkali metal, alkaline earth metal, or aluminum;
 g) a carboxylic acid salt of an alkali metal, alkaline earth metal, or aluminum;
 h) a polyhydroxylalkylamine; or
 i) a halide salt of an alkali metal or alkaline earth metal.

34. The method of claim 32 wherein the retarder comprises at least one of an oxy-boron compound, lignin, a polyphosphonic acid, a carboxylic acid, a hydroxycarboxylic acid, polycarboxylic acid, hydroxylated carboxylic acid, fumaric, itaconic, malonic, borax, gluconic, and tartaric acid, lignosulfonates, ascorbic acid, isoascorbic acid, sulphonic acid-acrylic acid copolymer, and their corresponding salts, polyhydroxysilane, polyacrylamide, carbohydrates and mixtures thereof.

35. The method of claim 32 wherein the combination of admixtures is greater than 0% to about 2% retarder; about 5% to about 12% dispersant; and about 85% to about 95% accelerator based on dry solids.

36. The method of claim 32, further characterized in that the retarder and the polycarboxylate high range water reducing dispersant are added to the hydraulic cement before the accelerator.

37. The method of claim 32, wherein the polycarboxylate high range water reducing dispersant has a solids content of about 20 percent to about 30 percent and is present in an amount from about 2 to about 35 oz/cwt; the retarder has a solids content of about 10 percent to about 20 percent and is present in an amount of greater than 0 to about 6 oz/cwt; and the accelerator has a solids content of about 30 percent to about 50 percent and is present in an amount of about 20 to about 120 oz/cwt; based on the dry weight of the cementitious material.

38. The method of claim 32, wherein the polycarboxylate high range water reducing dispersant has a solids content of about 20 percent to about 30 percent and is present in an amount from about 10 to about 25 oz/cwt; the retarder has a solids content of about 10 percent to about 20 percent and is present in an amount of about 0.1 to about 5 oz/cwt; and the accelerator has a solids content of about 30 percent to about 50 percent and is present in an amount of about 60 to about 120 oz/cwt; based on the dry weight of the cementitious material.

39. The method of claim 32, wherein the primary active ingredient of the polycarboxylate high range water reducing dispersant is about 0.027 percent to about 0.68 percent; the primary active ingredient of the retarder is about 0.002 percent to about 0.053; and, the primary active ingredient of the accelerator is about 0.018 percent to about 2.03; per 100 pounds of dry cementitious material.

40. The method of claim 32, wherein an air entrainer is present in an amount of about 0.2 oz/cwt to about 6 oz/cwt based on the dry weight of the cementitious material.

41. The method of claim 32 wherein the hydraulic cement is portland cement.

42. The method of claim 32 further including in the mixture at least one of silica fume, metakaolin, fly ash, calcined clay, or granulated blast furnace slag.

43. The method of claim 32 further comprising a cement admixture or additive that is selected from the group consisting of air detraining agent, foaming agent, corrosion inhibitor, shrinkage compensation agent, fiber, pigment, pozzolan, clay, strength enhancing agents, rheology modifying agents, water repellents, wetting agents, water soluble polymers, dampproofing admixtures, gas formers, permeability reducers, pumping aids, fungicidal admixtures, germicidal admixtures, insecticidal admixtures, finely divided mineral admixtures, alkali-reactivity reducer, bonding admixtures, aggregate and mixtures thereof.

44. A high early-strength cementitious composition, comprising a hydraulic cement and a composition of admixtures, said composition of admixtures in combination comprising:
   a) a polycarboxylate high range water reducing dispersant of the following formula;

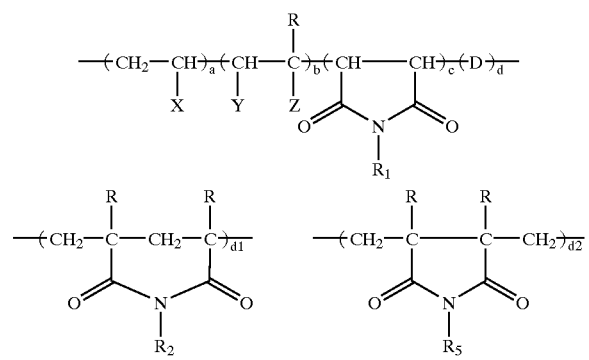

D=a component selected from the group consisting of the structure d1, the structure d2, and mixtures thereof;
X=H, $CH_3$, $C_2$ to $C_6$ Alkyl, Phenyl, Substituted Phenyl;
Y=H, —COOM;
R=H, $CH_3$;

Z=H, —$SO_3M$, —$PO_3M$, —COOM, —$OR_3$, —$COOR_3$, —$CH_2OR_3$, —$CONHR_3$, —$CONHC(CH_3)_2$ $CH_2SO_3M$, —$COO(CHR_4)_nOH$ where n=2 to 6;
$R_1$, $R_2$, $R_3$, $R_5$ are each independently —$(CH_2CHRO)_mR_4$ random copolymer of oxyethylene units and oxypropylene units where m=10 to 500 and wherein the amount of oxyethylene in the random copolymer is from about 60% to 100% and the amount of oxypropylene in the random copolymer is from 0% to about 40%;
$R_4$=H, Methyl, $C_2$ to $C_6$ Alkyl;
M=Alkali Metal, Alkaline Earth Metal, Ammonia, Amine, Methyl, $C_2$ to $C_6$ Alkyl;
a=0–0.8;
b=0.2–1.0;
c=0–0.5;
d=0–0.5; and
   wherein a, b, c, and d represent the mole fraction of each unit and the sum of a, b, c, and d is 1.0;
   b) an accelerator; and
   c) a retarder.

45. The cementitious composition of claim 44, wherein the accelerator comprises at least one of:
   a) a nitrate salt of an alkali metal, alkaline earth metal, or aluminum;
   b) a nitrite salt of an alkali metal, alkaline earth metal, or aluminum;
   c) a thiocyanate of an alkali metal, alkaline earth metal or aluminum;
   d) an alkanolamine;
   e) a thiosulphate of an alkali metal, alkaline earth metal, or aluminum;
   f) a hydroxide of an alkali metal, alkaline earth metal, or aluminum;
   g) a carboxylic acid salt of an alkali metal, alkaline earth metal, or aluminum;
   h) a polyhydroxylalkylamine; or
   i) a halide salt of an alkali metal or alkaline earth metal.

46. The cementitious composition of claim 44 wherein the retarder is selected from the group consisting of an oxyboron compound, lignin, a polyphosphonic acid, a carboxylic acid, a hydroxycarboxylic acid, polycarboxylic acid, hydroxylated carboxylic acid, fumaric, itaconic, malonic, borax, gluconic, and tartaric acid, lignosulfonates, ascorbic acid, isoascorbic acid, sulphonic acid-acrylic acid copolymer, and their corresponding salts, polyhydroxysilane, polyacrylamide, carbohydrates and mixtures thereof.

47. The cementitious composition of claim 44 wherein the accelerator is calcium nitrite.

48. The cementitious composition of claim 44 further comprising a shrinkage reducing agent selected from the group consisting of alkali metal sulfate, alkaline earth metal sulfate, and alkaline earth oxide.

49. The cementitious composition of claim 44 further comprising an air entrainer selected from the group consisting of wood resin, sulfonated lignin, petroleum acids, proteinaceous material, fatty acids, resinous acids, alkylbenzene sulfonates, sulfonated hydrocarbons, vinsol resin, anionic surfactants, cationic surfactants, nonionic surfactants, natural rosin, synthetic rosin, an inorganic air entrainer, synthetic detergents, and their corresponding salts, and mixtures thereof.

50. The cementitious composition of claim 44 wherein the combination of admixtures is greater than 0% to about 2% retarder; about 5% to about 12% dispersant; and about 85% to about 95% accelerator based on weight of dry solids.

51. The cementitious composition of claim 44, further characterized in that the retarder and the polycarboxylate high range water reducing dispersant are added to the hydraulic cement before the accelerator.

52. The cementitious composition of claim 44, wherein the polycarboxylate high range water reducing dispersant has a solids content of about 20 percent to about 30 percent and is present in an amount from about 2 to about 35 oz/cwt; the retarder has a solids content of about 10 percent to about 20 percent and is present in an amount of greater than 0 to about 6 oz/cwt; and the accelerator has a solids content of about 30 percent to about 50 percent and is present in an amount of about 20 to about 120 oz/cwt; based on the dry weight of the cementitious material.

53. The cementitious composition of claim 44, wherein the polycarboxylate high range water reducing dispersant has a solids content of about 20 percent to about 30 percent and is present in an amount from about 10 to about 25 oz/cwt; the retarder has a solids content of about 10 percent to about 20 percent and is present in an amount of about 0.1 to about 5 oz/cwt; and the accelerator has a solids content of about 30 percent to about 50 percent and is present in an amount of about 60 to about 120 oz/cwt; based on the dry weight of the cementitious material.

54. The cementitious composition of claim 44, wherein the primary active ingredient of the polycarboxylate high range water reducing dispersant is about 0.027 percent to about 0.68 percent; the primary active ingredient of the retarder is about 0.002 percent to about 0.053; and, the primary active ingredient of the accelerator is about 0.018 percent to about 2.03; per 100 pounds of dry cementitious material.

55. The cementitious composition of claim 44, wherein an air entrainer is present in an amount of about 0.2 oz/cwt to about 6 oz/cwt based on the dry weight of the cementitious material.

* * * * *